(12) United States Patent
Lupowitz et al.

(10) Patent No.: US 11,477,005 B1
(45) Date of Patent: Oct. 18, 2022

(54) SYSTEMS FOR MULTI-BLOCKCHAIN, MULTI-TOKEN INTEROPERABILITY VIA COMMON BLOCKCHAIN INTEGRATION AND METHODS OF USE THEREOF

(71) Applicant: Tassat Group Inc., New York, NY (US)

(72) Inventors: Kevin Lupowitz, New York, NY (US); Eric Couillard, New York, NY (US); Sanjaya Kulkarni, Edison, NJ (US); Brian Bruce, Glen Rock, NJ (US); Sanjay Deshpande, East Brunswick, NJ (US); Omari Edwards, West Orange, NJ (US); Joe Grastara, Toms River, NJ (US); Al Gleicher, Elmhurst, NY (US)

(73) Assignee: TASSAT GROUP INC., New York, NY (US)

( * ) Notice: Subject to any disclaimer, the term of this patent is extended or adjusted under 35 U.S.C. 154(b) by 0 days.

(21) Appl. No.: 17/592,183

(22) Filed: Feb. 3, 2022

(51) Int. Cl.
   *H04L 9/00* (2022.01)

(52) U.S. Cl.
   CPC . *H04L 9/00* (2013.01); *H04L 9/50* (2022.05)

(58) Field of Classification Search
   CPC .............................. H04L 9/00; H04L 2209/38
   See application file for complete search history.

(56) References Cited

U.S. PATENT DOCUMENTS

| | | | |
|---|---|---|---|
| 11,200,569 B1* | 12/2021 | James | G06Q 20/381 |
| 11,308,487 B1* | 4/2022 | Foster | G06Q 30/0609 |
| 2014/0279551 A1* | 9/2014 | Samid | G06Q 30/06 705/64 |
| 2020/0250590 A1* | 8/2020 | Augustine | G06F 21/16 |
| 2020/0274712 A1* | 8/2020 | Gray | H04L 9/3247 |
| 2021/0019737 A1* | 1/2021 | Vladi | G06Q 20/0658 |
| 2021/0158335 A1* | 5/2021 | Bollen | G06Q 20/02 |
| 2021/0398104 A1* | 12/2021 | Yan | G06Q 20/36 |

* cited by examiner

*Primary Examiner* — Matthew Smithers
(74) *Attorney, Agent, or Firm* — Greenberg Traurig, LLP

(57) ABSTRACT

Systems and/or methods of the present disclosure enable crypto-ledger interoperability using a controller to perform an operation between a first user and a second user on separate entity-specific distributed crypto-ledgers, where the separate entity-specific distributed crypto-ledgers are both operatively linked to a membered common distributed crypto-ledger. The controller burns a first quantity of first entity-specific crypto-tokens from the first entity-specific distributed crypto-ledger and mints a second quantity of the common crypto-tokens on the membered common distributed crypto-ledger, where the first quantity of first entity-specific crypto-tokens and the second quantity of the common crypto-tokens represent an equivalency. The controller moves the second quantity of common crypto-tokens from a first encrypted storage to a second encrypted storage of the membered common distributed crypto-ledger, burns the second quantity of the common crypto-tokens and mints a third quantity of the second entity-specific crypto-tokens on the second entity-specific distributed crypto-ledger to complete the operation.

20 Claims, 9 Drawing Sheets

SYSTEMS FOR MULTI-BLOCKCHAIN, MULTI-TOKEN INTEROPERABILITY VIA COMMON BLOCKCHAIN INTEGRATION AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Tassat Group LLC, All Rights Reserved.

FIELD OF TECHNOLOGY

The present disclosure generally relates to computer-based platforms and/or system configured for multi-blockchain and multi-token interoperability, and in particular, integration into a common blockchain to provide interoperability between multiple entity-specific and/or private blockchains utilizing entity-specific and/or private cryptographic tokens.

BACKGROUND OF TECHNOLOGY

A blockchain is a growing list of records, called blocks, that are linked together using cryptography. Each block may include a cryptographic hash of a previous block and transaction data. As blocks each have information about the block previous to it, the blocks form a chain, with each additional block reinforcing the blocks before it. Therefore, blockchains are resistant to modification because once recorded, the data in any given block cannot be altered retroactively without altering all subsequent blocks. Blockchains are typically managed by a peer-to-peer network for use as a distributed ledger, where nodes collectively adhere to a protocol to communicate and validate new blocks.

SUMMARY OF DESCRIBED SUBJECT MATTER

Embodiments of the present disclosure include one or more methods for crypto-ledger interoperability. In some embodiments, the method(s) includes: receiving, by a controller of a membered common distributed crypto-ledger, a first instruction to perform at least one operation between a first user, associated with a first entity-specific distributed crypto-ledger of a first entity, and a second user, associated with a second entity-specific distributed crypto-ledger of a second entity, where the first instruction includes: a first encrypted storage identifier that identifies a first encrypted storage associated with the first user and a second encrypted storage identifier that identifies a second encrypted storage associated with the second user, where the first entity is different from the second entity, where the first entity and the second entity are members of the membered common distributed crypto-ledger, where the first entity-specific distributed crypto-ledger of the first entity is operatively linked to the membered common distributed crypto-ledger via a first common encrypted storage, stored on a first common node of the membered common distributed crypto-ledger, where the second entity-specific distributed crypto-ledger of the second entity is operatively linked to the membered common distributed crypto-ledger via a second common encrypted storage, stored on a second common node of the membered common distributed crypto-ledger, where the first common encrypted storage is a first entity encrypted storage for all users of the first entity-specific distributed crypto-ledger, where the second common encrypted storage is a second entity encrypted storage for all users of the second entity-specific distributed crypto-ledger; determining, by the controller, a first quantity of first entity-specific crypto-tokens on the first entity-specific distributed crypto-ledger based at least in part on the at least one operation; determining, by the controller, a second quantity of common crypto-tokens that is equivalent to the first quantity of the first crypto-tokens; instructing, by the controller, the first common node to burn the first quantity of first entity-specific crypto-tokens from the first entity-specific distributed crypto-ledger; instructing, by the controller, the membered common distributed crypto-ledger to mint the second quantity of the common crypto-tokens in the first common distributed crypto-ledger encrypted storage on the membered common distributed crypto-ledger; instructing, by the controller, the membered common distributed crypto-ledger to move the second quantity of common crypto-tokens from the first common distributed crypto-ledger encrypted storage to a second common distributed crypto-ledger encrypted storage; determining, by the controller, a third quantity of second entity-specific crypto-tokens that is equivalent to the second quantity of the common crypto-tokens; instructing, by the controller, the second common node of the common distributed crypto-ledger to burn the second quantity of the common crypto-tokens from the second common distributed crypto-ledger encrypted storage; instructing, by the controller, the second entity-specific distributed crypto-ledger to mint the third quantity of the second entity-specific crypto-tokens on the second entity-specific distributed crypto-ledger so as to convert the common crypto-tokens to the second entity-specific crypto-tokens; and returning, by the controller, a confirmation that confirms the at least one operation based at least in part on the third quantity of the at least one second crypto-token being minted in the second encrypted storage.

Embodiments of the present disclosure include one or more systems for crypto-ledger interoperability. In some embodiments, the system(s) includes a controller. The controller may be configured to perform steps to: receive, from a membered common distributed crypto-ledger, a first instruction to perform at least one operation between a first user, associated with a first entity-specific distributed crypto-ledger of a first entity, and a second user, associated with a second entity-specific distributed crypto-ledger of a second entity, where the first instruction includes: a first encrypted storage identifier that identifies a first encrypted storage associated with the first user and a second encrypted storage identifier that identifies a second encrypted storage associated with the second user, where the first entity is different from the second entity, where the first entity and the second entity are members of the membered common distributed crypto-ledger, where the first entity-specific distributed crypto-ledger of the first entity is operatively linked to the membered common distributed crypto-ledger via a first common encrypted storage, stored on a first common node of the membered common distributed crypto-ledger, where the second entity-specific distributed crypto-ledger of the second entity is operatively linked to the membered common distributed crypto-ledger via a second common encrypted storage, stored on a second common node of the membered common distributed crypto-ledger, where the first common encrypted storage is a first entity encrypted storage for all users of the first entity-specific distributed crypto-ledger, where the second common encrypted storage is a second entity encrypted storage for all users of the second entity-specific distributed crypto-ledger; determine a first quantity of first entity-specific crypto-tokens on the first entity-specific distributed crypto-ledger based at least in part on the at least one operation; determine a second quantity of common crypto-tokens that is equivalent to the first quantity of the first crypto-tokens; instruct the first common node to burn the first quantity of first entity-specific crypto-tokens from the first entity-specific distributed crypto-ledger; instruct the membered common distributed crypto-ledger to mint the second quantity of the common crypto-tokens in the first common distributed crypto-ledger encrypted storage on the membered common distributed crypto-ledger; instruct the membered common distributed crypto-ledger to move the second quantity of common crypto-tokens from the first common distributed crypto-ledger encrypted storage to a second common distributed crypto-ledger encrypted storage; determine a third quantity of second entity-specific crypto-tokens that is equivalent to the second quantity of the common crypto-tokens; instruct the second common node of the common distributed crypto-ledger to burn the second quantity of the common crypto-tokens from the second common distributed crypto-ledger encrypted storage; instruct the second entity-specific distributed crypto-ledger to mint the third quantity of the second entity-specific crypto-tokens on the second entity-specific distributed crypto-ledger so as to convert the common crypto-tokens to the second entity-specific crypto-tokens; and return confirmation that confirms the at least one operation based at least in part on the third quantity of the at least one second crypto-token being minted in the second encrypted storage.

Embodiments of the system(s) and/or method(s) of the present disclosure may further include: accessing, by the controller, a user-entity registry including a mapping of encrypted storage identifiers enrolled with the membered common distributed crypto-ledger to entity-specific distributed crypto-ledgers enrolled with the membered common distributed crypto-ledger; and determining, by the controller, the second common distributed crypto-ledger encrypted storage based at least in part on the second encrypted storage identifier and the user-entity registry.

Embodiments of the system(s) and/or method(s) of the present disclosure may further include: utilizing, by the controller, a first interoperability smart contract to instruct the first common node to burn the first quantity of first crypto-tokens from the first encrypted storage; and utilizing, by the controller, a second interoperability smart contract to instruct the second common node to mint the third quantity of second entity-specific crypto-tokens from the first encrypted storage.

Embodiments of the system(s) and/or method(s) of the present disclosure may further include where the first interoperability smart contract to further instructs the first common node to produce at least one operation record representing the at least one operation; and where the at least one operation record includes the second encrypted storage identifier.

Embodiments of the system(s) and/or method(s) of the present disclosure may further include: receiving, by the controller, the at least one operation record from the first common node; utilizing, by the controller, a common interoperability smart contract to mint the second quantity of the common crypto-tokens in the first common distributed crypto-ledger encrypted storage on the membered common distributed crypto-ledger; and utilizing, by the controller, a common interoperability smart contract to instruct the membered common distributed crypto-ledger to move the second quantity of common crypto-tokens from the first common distributed crypto-ledger encrypted storage to the second common distributed crypto-ledger encrypted storage based at least in part on the at least one operation record.

Embodiments of the system(s) and/or method(s) of the present disclosure may further include where the common interoperability smart contract causes the membered common distributed crypto-ledger to create a membered common distributed crypto-ledger entry including the second quantity of common crypto-tokens and the at least one operation record.

Embodiments of the system(s) and/or method(s) of the present disclosure may further include where the first entity-specific crypto-tokens include a first stablecoin, where the second entity-specific crypto-tokens include a second stablecoin; and where the common crypto-tokens include a third stablecoin.

Embodiments of the system(s) and/or method(s) of the present disclosure may further include where the first instruction causes the first entity-specific crypto-ledger to move the first quantity of the first entity-specific crypto-tokens from the first encrypted storage to a first common node encrypted storage of the first common node.

Embodiments of the system(s) and/or method(s) of the present disclosure may further include instructing, by the controller, the second entity-specific distributed crypto-ledger to move the third quantity of the second entity-specific crypto-tokens from a second common node encrypted storage of the second common node to the second encrypted storage.

Embodiments of the system(s) and/or method(s) of the present disclosure may further include: receiving, by the controller, a first notification indicative of the asset quantity being stored in a first common omnibus associated with the first entity; instructing, by the controller, the membered common distributed crypto-ledger to mint the second quantity of the common crypto-tokens in the first common distributed crypto-ledger encrypted storage on the membered common distributed crypto-ledger based on the notification so as to create in the first common distributed crypto-ledger encrypted storage the second quantity of the common crypto-tokens based on the asset quantity; receiving, by the controller, a second notification indicative of the asset quantity being received by a second common omnibus associated with the second entity; and instructing, by the controller, the second common node of the common distributed crypto-ledger to burn the second quantity of the common crypto-tokens from the second common distributed crypto-ledger encrypted storage in response to the second notification.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 9 illustrate systems and methods of multi-blockchain and multi-token interoperability. The following embodiments provide technical solutions and technical improvements that overcome technical problems, drawbacks and/or deficiencies in the technical fields involving blockchains, including multiple blockchain protocols and/or cryptographic tokens and/or parallel blockchains that provide an obstacle to interoperability between the multiple blockchains, thus preventing operations on one blockchain interacting with another blockchain. As explained in more detail, below, technical solutions and technical improvements herein include aspects of improved interoperability amongst parallel blockchains to enable a user to perform operations and engage in blockchain-related activities with a user of another blockchain despite having separate blockchains and cryptographic tokens. Based on such technical features, further technical benefits become available to users and operators of these systems and methods. Moreover, various practical applications of the disclosed technology are also described, which provide further practical benefits to users and operators that are also new and useful improvements in the art.

Figure 1:
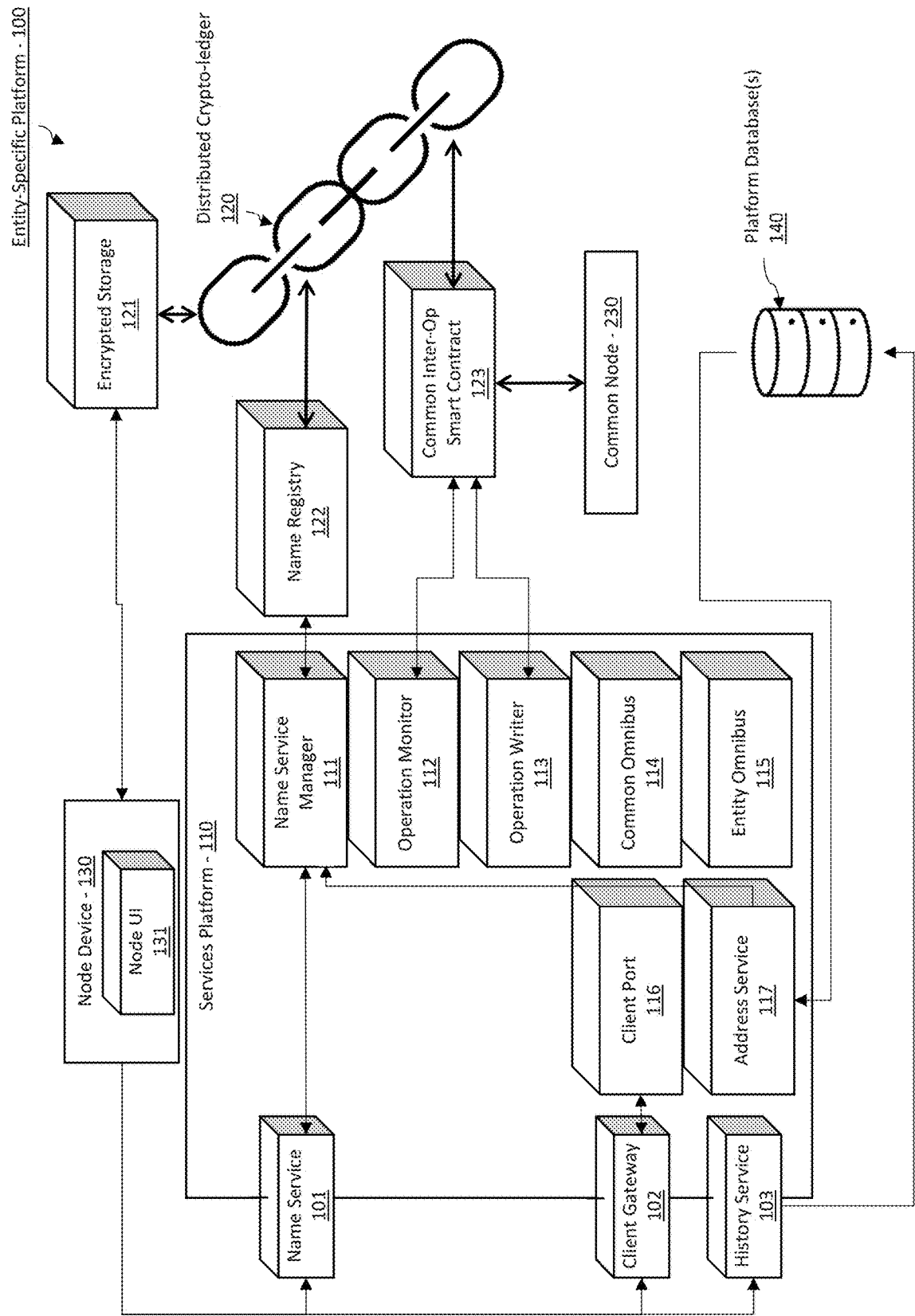
FIG. 1 is a block diagram of an exemplary computer-based system and platform for an entity-specific platform 100 designed to interoperability with other blockchain platforms via a common member blockchain in accordance with one or more embodiments of the present disclosure.

FIG. 1 is a block diagram of an exemplary computer-based system and platform for an entity-specific platform 100 designed to interoperability with other blockchain platforms via a common member blockchain in accordance with one or more embodiments of the present disclosure.

In some embodiments, a multi-blockchain system may enable interoperability between the multiple blockchains by utilizing one or more entity-specific platforms 100. Each entity-specific platform 100 may include a services platform 110 and distributed crypto-ledger 120 that is specific to a corresponding entity or entities. For example, the distributed crypto-ledger 120 may include a private distributed ledger for users of the services platform 110. However, the distributed crypto-ledger 120 may include any distributed ledger, public or private or a combination thereof, that is specifically managed/administered or otherwise associated with the entity-specific platform 100.

In some embodiments, the services platform 110 may include any suitable platform for hosting one or more software services, including, e.g., local or on-premises hardware for instantiating and executing the software of each service, remote hardware for instantiating and executing the software of each service such as one or more servers, server systems and/or cloud platforms, or any combination of local, on-premises and/or remote hardware and/or software that is suitable for instantiating, hosting and/or executing at least a portion of the functionality of each service of the services platform.

In some embodiments, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

In some embodiments, the term "virtual machine (VM)" identifies at least one software component and/or a combination of at least one software component and at least one hardware component which are designed/programmed/configured to virtually emulate physical computer systems, such as, e.g., system virtual machines that provide a virtualization of a physical machine, a process virtual machine that is designed to execute computer programs in a virtual environment, or other duplication of real computing systems in a virtual environment. In some embodiments, the virtual machine(s) may employ sandboxes and/or containers for isolating each service of the services platform in order to ensure security and data privacy.

In some embodiments, the term "sandbox" and/or "container" identifies at least one software component and/or a combination of at least one software component and at least one hardware component which are designed/programmed/configured to manage/control untested and untrusted programs or code from, e.g., unverified, untrusted third parties, suppliers, users and/or websites, without risking harm to a host machine, such as a computing device, mobile computing device, server, cloud platform, or other devices and/or systems. As used herein, the term "sandbox" may include virtualization techniques to separate a program and or code from the host system to mitigate system failures and/or software vulnerabilities to prevent the program and/or code from harming the host system and/or device.

In some embodiments, a user may interact with the entity-specific platform 100 from a node device 130 in communication with the services platform 110. In some embodiments, the node device 130 may include any suitable computing device for communicating directly and/or over a network with the services platform 110. In some embodiments, a computing device may include or be incorporated, partially or entirely into at least one personal computer (PC), laptop computer, ultra-laptop computer, tablet, smartphone, wearable (e.g., smartwatch or other wearable computing device), touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, the node device 130 may be configured to render and present, e.g., via a suitable software application, software platform, operating system, or other software functionality, a node user interface (UI) 131. In some embodiments, the node UI 131 may include one or more UI elements, including, e.g., buttons, toggles, switches, text input, content frames, inline frames (iframes), among other content presentation and/or user interaction elements. In some embodiments, the node UI 131 enables the user to view user-related data, input user-related data, input instructions, commands and/or requests to the services platform 110 and/or the distributed crypto-ledger 120, among other user interactions or any combination thereof.

In some embodiments, the user interactions with the node UI 131 of the node device 130 may be communicated to the services platform 110, e.g., via one or more suitable communication and/or interfacing protocols, such as, e.g., File Transfer Protocol (FTP), Hyper-Text Transport Protocol (HTTP), Transmission Control Protocol (TCP), application protocol interface (API), REpresentational State Transfer (REST), publish-subscribe messaging, request-reply messaging, push-pull messaging, exclusive pair messaging, Simple Object Access protocol (SOAP), among others or any combination thereof. In some embodiments, the node device 130 may communicate with the services platform 110 via any suitable direct or networked interface, such as, e.g., the Universal Serial Bus (USB), Peripheral Component Interconnect Express (PCIe), Bluetooth, WiFi, Ethernet, cellular networking (e.g., 3G, 4G, 5G, 6G, etc, WiMax, GSM, CDMA, UMTS, etc.), among other wired and/or wireless interfaces or any combination thereof.

In some embodiments, the term "application programming interface" or "API" refers to a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

In some embodiments, the wired and/or wireless interfaces may include a networked arrangement. In some embodiments, the network may include any suitable computer network, including, two or more computers that are connected with one another for the purpose of communicating data electronically. In some embodiments, the network may include a suitable network type, such as, e.g., a local-area network (LAN), a wide-area network (WAN) or other suitable type. In some embodiments, a LAN may connect computers and peripheral devices in a physical area, such as a business office, laboratory, or college campus, by means of links (wires, Ethernet cables, fiber optics, wireless such as Wi-Fi, etc.) that transmit data. In some embodiments, a LAN may include two or more personal computers, printers, and high-capacity disk-storage devices called file servers, which enable each computer on the network to access a common set of files. LAN operating system software, which interprets input and instructs networked devices, may enable communication between devices to: share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, or other wide-area connection means. In some embodiments, an example of a WAN may include the Internet.

In some embodiments, the user may input an instruction, command and/or request to control the distributed crypto-ledger 120, such as an operation with tokens stored in an encrypted storage 121 associated with the user. In some embodiments, the tokens may include any suitable digital tokenization of real and/or virtual items, such as, e.g., currency, financial assets, artwork, or any other suitable physical item. In some embodiments, the tokens may include a digital file or other digital item that does not relate to any physical item, but is rather a non-fungible, uniquely identifiable, purely digital item. For example, the tokens may include, e.g., a suitable cryptocurrency, such as, e.g., bitcoin, Litecoin, Ether, a stablecoin or any other suitable cryptographic token.

In some embodiments, the distributed crypto-ledger 120 may be configured interact and/or to store data in one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices may be configured to affect transactions involving Bitcoins and other cryptocurrencies into one another and also into (or between) so-called FIAT money or FIAT currency and vice versa.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

In some embodiments, the encrypted storage 121 may include a virtual location that is addressed on the distributed crypto-ledger 120. In some embodiments, the virtual location may be defined according to any suitable addressing scheme. In some embodiments, the distributed crypto-ledger 120 may utilize a pay-to-internet protocol (P2IP) addressing scheme where the encrypted storage 121 is addressed via an IP address. However, in some embodiments, to improve the security of the distributed crypto-ledger 120, the distributed crypto-ledger 120 may utilize a cryptographic-based addressing scheme, such as, e.g., Pay To Public Key Hash P2PKH addressing, Pay to Script Hash (P2SH) addressing, the Cryptonote algorithm addressing, Ethereum addressing, or other suitable addressing scheme to identify encrypted storages or any suitable combination thereof.

In some embodiments, the entity-specific platform 100 is one of multiple entity-specific platforms 100 and/or entity-specific distributed crypto-ledgers 120. Accordingly, the address of the encrypted storage 121 may be an ecosystem-wide address that is unique to the encrypted storage 121 across all distributed crypto-ledgers 120. Thus, the user may input, via the node UI 131 of the node device 130, an address to another encrypted storage on the distributed crypto-ledger 120 or on another distributed crypto-ledger, and request and/or initiate operations with the other encrypted storage.

In some embodiments, in order to make referencing the encrypted storage 121 or any other encrypted storage within the ecosystem of entity-specific platforms 100, domain names may be mapped to the addresses of each encrypted storage 121. In some embodiments, a table, termed an "address book", of the mapping of domain names to addresses, along with metadata associated with each address, may be maintained in a platform database(s) 140. In some embodiments, the platform database(s) 140 may be specific to the entity-specific platform 100, e.g., administered, controlled or otherwise correlated with the entity-specific platform 100, and may be replicated or mirrored to platform database(s) specific to other entity-specific platforms 100 in the ecosystem. In some embodiments, the platform database(s) 140 may be shared across the entity-specific platforms in the ecosystem, or any combination of shared and/or specific to the entity-specific platform 100.

In some embodiments, the services platform 110 may import the address book from the platform database(s) 140 using an address service 117. In some embodiments, the address service 117 of the services platform 110 may query the platform database(s) 140, e.g., periodically or upon a trigger by user input. In some embodiments, the address service 117 may query the platform database(s) 140, e.g., every hour, two hours, three hours, four hours, five hours, six hours, eight hours, ten hours, twelve hours, twenty four hours, every week, two weeks, three weeks, four weeks, every month, every calendar quarter, etc. or any other suitable period for maintaining an updated record of the addresses, metadata and/or domain names associated with each encrypted storage 121 in the ecosystem of entity-specific platforms 100.

In some embodiments, a user interaction via the node UI 131 may cause an update to the metadata and/or other data associated with the address of the encrypted storage 121 of the user. For example, the user may modify a network location, a device identifier, or other information related to the encrypted storage 121. Accordingly, in some embodiments, the node device 130 may interface with a history service 103 of the services platform 110. In some embodiments, the history service 103 may include a service and/or messaging interface of the services platform 110 to receive and record changes to the address associated with the user's encrypted storage 121.

In some embodiments, upon receiving the user interaction with updates to the metadata and/or data of the encrypted storage 121, the history service 103 may query the platform database(s) 140 to provide the update. In some embodiments, the history service 103 may specify the user, e.g., via a user identifier and/or the address of the encrypted storage 121, and the metadata and/or data associated with the user interaction that affects the encrypted storage 121. In some embodiments, the query may cause a record, such as an entry in the table, to be updated with the metadata and/or data to update the address.

In some embodiments, the node device 130 may interface with a name service 101 of the services platform 110. In some embodiments, the name service 101 may provide an interface between the node device 130 and a name service manager 111 to manage a domain name associated with a specified encrypted storage. For example, the user may select or otherwise input data to interact with an encrypted storage of another user, such as, e.g., to transfer data from the user's encrypted storage 121 to the encrypted storage of the other user. In doing so, the user may provide, e.g., via the node UI 131, a domain name associated with the other user, and thus with the address of the other user's encrypted storage.

In some embodiments, the name service manager 111 may utilize and/or modify the metadata and/or data for the address of each encrypted storage to define domain names and/or identify the source and destination of operations across the distributed crypto-ledger 120 and/or ecosystem. In some embodiments, the name service manager 111 may serve as a persistor of the address book records that maps names to addresses, e.g., using metadata, and maps addresses to names, e.g., using metadata. Accordingly, in some embodiments, the name service manager 111 may be a local proxy for a global name service, such as for the Ethereum name service (ENS) or other ecosystem-wide name service. In some embodiments, the name service manager 111 may be a local and/or global name service.

In some embodiments, the name service manager 111 may establish a unique name convention for the entity-specific platform 100 and/or across all entity-specific platforms in the ecosystem. For example, the name convention may be a hierarchical structure specifying the entity and/or entity-specific platform of a particular encrypted storage, a name and/or domain name and/or user identifier associated with the entity-specific platform of the particular encrypted storage, and/or a token/crypto-token/crypto-coin name associated with the entity-specific platform of the particular encrypted storage. An example naming structure may include, e.g., <ENTITY>.<ENCRYPTED STORAGE NAME>.<ENTITY-SPECIFIC COIN>, among other variations and/or combinations of identifying features of the particular encrypted storage.

In some embodiments, where the user is first creating the encrypted storage 121, the user may input a selection via the node UI 131 to trigger the name service 101 to address the encrypted storage 121 on the distributed crypto-ledger 120. In some embodiments, the name service 101 may produce an instruction to the name service manager 111 to map a user provided name (e.g., domain name, user name, etc.) to an address. In some embodiments, the name service manager 111 may reference the address book imported by the address service 117 to determine an availability of the user provided name. Where the user provided name is already in use, the name service manager 111 may instruct the name service 101 to return a notification to the node UI 131 to render a message that the user provided name is already in use and to request a new user provided name. In some embodiments, the address may be a cryptographically generated address as described above, e.g., based on a public key and/or private key associated with the node device 130, or an IP address associated with the node device 130 or any combination thereof.

In some embodiments, creating the address may include the name service manager 111 instructing the address service 117 to add a record in the address book of the platform database(s) 140 for the address-name mapping of the user's encrypted storage 121. In some embodiments, the name service manager 111 and/or the history service 103 may utilize the user input to update the address book with data and/or metadata associated with the encrypted storage 121, such as, e.g., user data (e.g., identity and/or credential data), a public key, a time of creation, a date of creation, among other data and/or metadata.

In some embodiments, the name service manager 111 may interface with a name registry 122 to register a new name on the distributed crypto-ledger 120. In some embodiments, the name registry 122 may include a registrar, which may be, e.g., a smart contract, that controls the top level domain of the name registry 122. In some embodiments, the registrar automatically records in the name registry 122 ownership of a name, e.g., according to the mappings between the name and the address of the encrypted storage 121. In some embodiments, the registrar may record a name to address mapping, an address to name mapping, or both, such that the name registry 122 may correlate a provided name and/or provided address with a particular encrypted storage within the top level domain. In some embodiments, the top level domain may be set according to the hierarchical scheme described above, e.g., a domain associated with the entity-specific platform 100 and/or the distributed crypto-ledger 120 of the entity-specific platform 100.

Accordingly, in some embodiments, each entity-specific platform in the ecosystem may have a name registry associated with the top level domain of each entity-specific platform. Thus, each name registry of each entity-specific platform may provide the registry of name and address mappings within the associated distributed crypto-ledger. As a result, when locating a particular encrypted storage, a message may be directed to the associated entity-specific platform within the ecosystem of entity-specific platforms based on the top level domain, and then the associated entity-specific platform may direct the message to the encrypted storage based on the name registry of the associated entity-specific platform.

In some embodiments, the name registry 122, platform database(s) 140 and/or the name service manager 111 of the services platform 110 enables a user to initiate operations between the encrypted storage 121 and an encrypted storage of another user, either on the same entity-specific platform 100 or on another entity-specific platform across the ecosystem. In some embodiments, to initiate such an operation, the user may select and/or input, e.g., via the node UI 131, operation parameters. The operation parameters may include, e.g., the name and/or address of the encrypted storage 121, a name and/or address of an encrypted storage of another user, an operation type indicative of the type of operation to be performed, an operation quantity indicative of a quantity of data and/or data items associated with the operation (e.g., files, number of files, number of tokens, value of tokens, number of characters/digits, number of words, etc.), a payload of the operation (e.g., the file(s), token(s), character(s), digit(s), word(s) or any combination thereof to be employed in the operation), a date and/or time to execute the operation, a recurring period for executing the operation on a recurring basis, among other parameters or any combination thereof.

In some embodiments, the node device 130 may communicate the operation parameters to the services platform 110 to initiate and/or execute the operation. In some embodiments, the node device 130 may use the user's interactions to produce an instruction configured to cause the services platform 110 to initiate and/or execute the operation. Accordingly, the instruction may include the operation parameters including a name for the encrypted storage 121 and a name of another encrypted storage of at least one other user associated with the operation.

In some embodiments, the services platform 110 may receive the instruction and, using one or more interfaces, may extract the operation parameters and execute the operation. In some embodiments, the name service 101 may extract the operation parameters including the names of the encrypted storages associated with the operation. In some embodiments, the name service manager 111 may utilize the name registry 122 to identify the address mapped to each name to determine a source encrypted storage and a destination encrypted storage for the operation, including, e.g., a hierarchical addressing scheme with a top-level domain name identifying the entity-specific platform of each encrypted storage of the operation, and one or more lower level domain names identifying the location on the distributed crypto-ledger of the identified entity-specific platform.

In some embodiments, a client gateway 102 may provide an interface for communications from the node device 130. In some embodiments, the client gateway 102 serves as an access point to the services platform 110, and may involve a change of addressing, forwarding packets between networks with different network prefixes. The networking software stack of each device contains a routing table that specifies which interface is used for transmission and which router on the network is responsible for forwarding to a specific set of addresses. If none of these forwarding rules is appropriate for a given destination address, the client gateway 102 is chosen as the router of last resort. The default gateway can be specified by the route command to configure the node's routing table and default route.

In some embodiments, the client gateway 102 may route the instruction to a client port 116. In some embodiments, a "port" refers to a communication endpoint. In some embodiments, the port can take the form of a logical construct at a software level that identifies a specific process or a type of network service. In some embodiments, a port is identified for each transport protocol and address combination by a port number, such as, e.g., 16-bit unsigned number. Examples of ports may include, e.g., File Transfer Protocol (FTP) data transfer (Port 20), FTP command control (Port 21), Secure Shell (SSH) secure login (Port 22), Telnet remote login service (Port 23), Simple Mail Transfer Protocol (SMTP) E-mail routing (Port 25), Domain Name System (DNS) service (Port 53), Dynamic Host Configuration Protocol (DHCP) (Port 67 or 68), Hypertext Transfer Protocol (HTTP) used in the World Wide Web (Port 80), Post Office Protocol (POP3) (Port 110), Network News Transfer Protocol (NNTP) (Port 119), Network Time Protocol (NTP) (Port 123), Internet Message Access Protocol (IMAP) (Port 143), Simple Network Management Protocol (SNMP) (Port 161), Internet Relay Chat (IRC) (Port 194), HTTP Secure (HTTPS) HTTP over TLS/SSL (Port 443), among others. Thus, the client port 116 may serve as the endpoint to communications from the node device 130.

The client port 116 may extract the operation parameters from the instruction to formulate a command to the services platform 110. Accordingly, the client port 116 may make the operation parameters available for the services platform 110 to execute the operation. In some embodiments, the instruction may include structured data specifying the operation parameters according to a predefined format, e.g., using comma-separated values, a data table, array, vector, or other suitable data type or any combination thereof. Thus, the client port 116 may extract the operation parameters based on the values defined by the structured data. In some embodiments, the instruction may employ unstructured data, in which case the client port 116 may employ a parse engine to parse the instruction and extract the operation parameters. The parse engine may include, e.g., natural language processing, keyword detection, among other parsing models and algorithms or any combination thereof.

In some embodiments, the client port 116 may direct operation parameters to an operation writer 113. In some embodiments, the operation writer 113 uses the operation parameters to write to the distributed crypto-ledger 120 using a common inter-operability smart contract 123. In some embodiments, based on an operation parameter define an operation type, the operation writer 113 may cause the distributed crypto-ledger 120 to initiate a common inter-operability smart contract 123 for performing the operation. In some embodiments, the operation type may include, e.g., a token redeem, a token deposit, a token transfer, among other operation types or any combination thereof.

In some embodiments, a token redeem operation may cause a smart contract for burning tokens (e.g., erasing tokens from the blockchain), and thus removing the tokens from the encrypted storage 121 of the user. As a result, the common inter-operability smart contract 123 and/or the services platform 110 may issue an operation initiation instruction to the entity omnibus 115 to transfer assets represented by the tokens from the user, e.g., in the user's account to the entity omnibus 115.

Additionally, in some embodiments, a token deposit operation may cause a smart contract for minting tokens (e.g., producing new tokens on the distributed crypto-ledger 120), and thus adding the tokens to the encrypted storage 121 of the user. As a result, the common inter-operability smart contract 123 and/or the services platform 110 may issue an operation initiation instruction to the entity omnibus 115 to transfer assets represented by the tokens to the user, e.g., from the entity omnibus 115 to the user's account.

In some embodiments, a token transfer operation may cause the common inter-operability smart contract 123 to use one or more additional smart contracts and/or functions within the common inter-operability smart contract 123 to move tokens from an encrypted storage 121 (the source encrypted storage) to another encrypted storage (the destination encrypted storage). In some embodiments, the encrypted storage 121 may be addressed to the distributed crypto-ledger 120 of the entity-specific platform 100 associated with the user, while the other encrypted storage 121 may be addressed to another distributed crypto-ledger of another entity-specific platform associated with the other user. Accordingly, the common inter-operability smart contract 123 may utilize the name registry 122 to identify a routing of the transfer operation from the source encrypted storage to the destination encrypted storage, even where the destination encrypted storage is addressed to a distributed crypto-ledger different from the distributed crypto-ledger 120. Alternatively, in some embodiments, the token transfer operation may cause the common inter-operability smart contract 123 to utilize one or more other smart contracts or functions of the common inter-operability smart contract 123 to perform a token redeem operation for the token storage to thereby remove a corresponding quantity of assets from the user account. The quantity of assets may then be transferred via the services platform 110 to another user account associated with the other encrypted storage, and the same or a different smart contract and/or the common inter-operability smart contract 123 may perform a token deposit operation to mint tokens on the distributed crypto-ledger 120 in the other encrypted storage.

In some embodiments, to move the tokens from the distributed crypto-ledger 120 to the other distributed crypto-ledger, the common inter-operability smart contract 123 may be configured to interface with a mating common inter-operability smart contract on a common platform by sending an instruction to a common node 230 associated with the common platform. The common node 230 may record the burning of the tokens from distributed crypto-ledger 120 and the operation parameters. The common node 230 may communicate the operation parameters to the common platform for minting and transfer of tokens between entity-specific platforms. In some embodiments, the common platform may then use the mating common inter-operability smart contract to mint the tokens on a common distributed crypto-ledger in an entity-specific encrypted storage of the entity associated with the entity-specific platform 100. As a result, the mating common inter-operability smart contract may move the tokens to another entity-specific encrypted storage of the other entity-specific platform associated with the other user based on the addressing of the operation. The mating common inter-operability smart contract may then burn the tokens from common distributed crypto-ledger so the tokens can be minted on the other distributed crypto-ledger and provided to the other encrypted storage of the other user via another common inter-operability smart contract of the other entity-specific platform. This network of inter-operability smart contracts linking entity-specific platforms via the common platform enables inter-operability across each entity-specific platform.

As a result, the transfer of tokens to the other encrypted storage may cause a movement of assets from the user account of the user into the entity omnibus 115. The services platform 110 may then transfer the assets from the entity omnibus 115 to a common omnibus 114 associated with the common platform. The common omnibus 114 is used as an omnibus asset database for storing assets of all operations subject to transfer across the platform of entity-specific platforms. Thus, the common omnibus 114 serves as a source and/or destination for assets transferred between entities as a result of operations to transfer tokens across the platform. For example, the user may transfer tokens to another user on another entity-specific platform, or may receive tokens from the other user, and accordingly, the common omnibus 114 may provide a location from with to transfer associated assets to the other user or receive associated assets from the other user, respectively.

In some embodiments, an operation monitor 112 may monitor the activity of the common inter-operability smart contract 123 to identify incoming operations, such as tokens transferred to the user from another entity-specific platform. In some embodiments, the common node 230 instructs the common inter-operability smart contract 123 to mint a token on the distributed crypto-ledger 120 for transfer to the encrypted storage 121, the operation monitor 112 may identify the instruction. In some embodiments, upon identifying the instruction, the operation monitor 112 may return to the node device 130 a notification or alert of the transferred tokens in the encrypted storage 121, e.g., via the client port 116, client gateway 102 and/or node UI 131.

As a result, in some embodiments, the entity-specific platform 100 is specifically architected to enable an exchange of tokens between the distributed crypto-ledger 120 and other crypto-ledgers in an ecosystem of separate distributed crypto-ledgers. Thus, the user may engage in activities involving the movement of tokens between disparate distributed crypto-ledgers.

Figure 2:
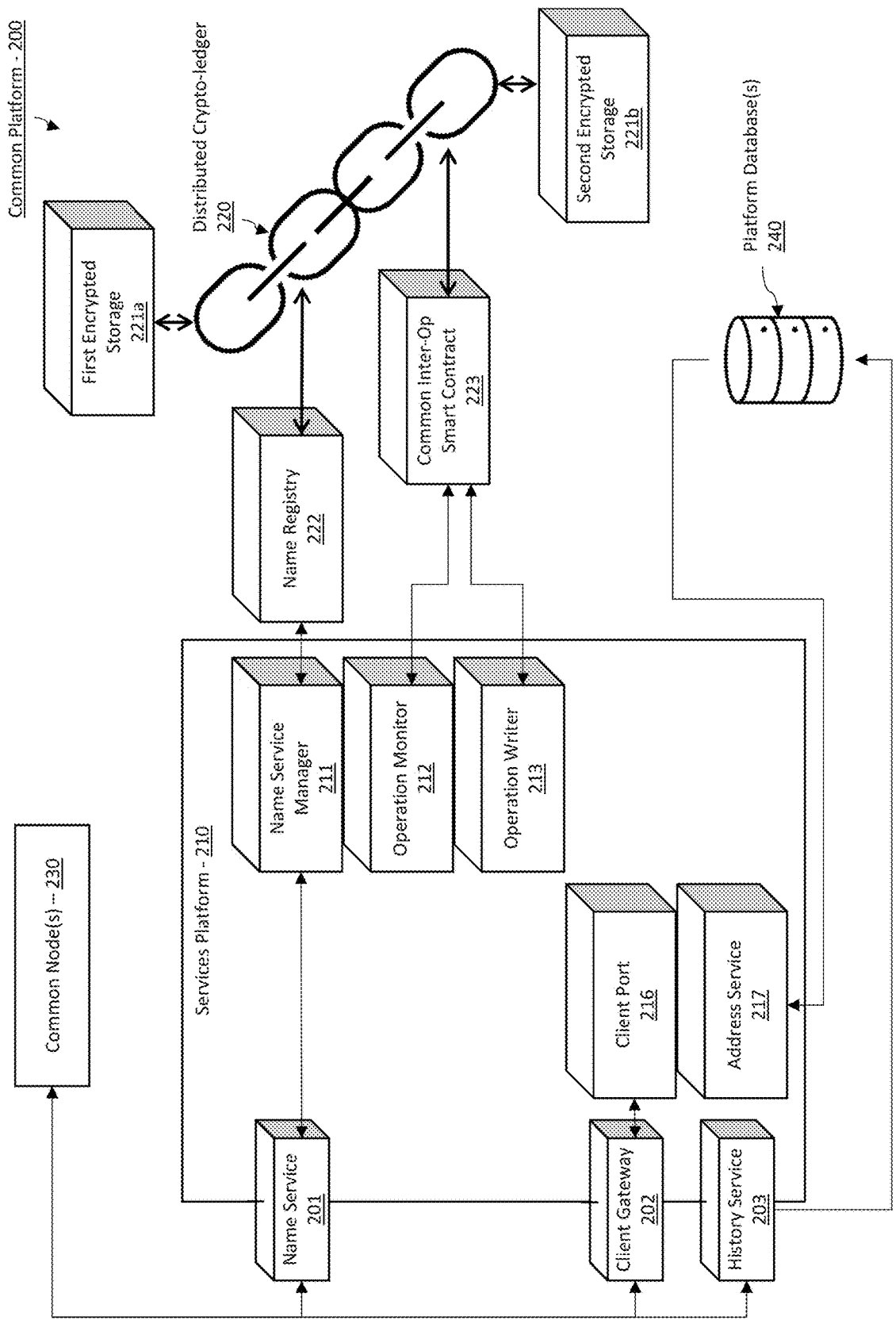
FIG. 2 is a block diagram of another exemplary computer-based system and platform a common platform 200 designed to provide interoperability amongst multiple separate blockchain platforms in accordance with one or more embodiments of the present disclosure.

FIG. 2 is a block diagram of another exemplary computer-based system and platform a common platform 200 designed to provide interoperability amongst multiple separate blockchain platforms in accordance with one or more embodiments of the present disclosure.

In some embodiments, a common platform 200 may be architected and configured to provide interoperability between the various entity-specific platforms 100 within an ecosystem of entity-specific platforms. In some embodiments, the common platform 200 may be connected to each entity-specific platform 100 via common node(s) 230 and a common inter-operability smart contract 223. As described above, the common node(s) 230 and entity-specific common inter-operability smart contracts 123 may interface to extract tokens from an entity-specific distributed crypto-ledger 120 and reproduce the tokens on the common distributed crypto-ledger 220, and vice versa.

Accordingly, in some embodiments, the common platform 200 may include a common distributed crypto-ledger 220 and a services platform 210. In some embodiments, the services platform 210 may include any suitable platform for hosting one or more software services, including, e.g., local or on-premises hardware for instantiating and executing the software of each service, remote hardware for instantiating and executing the software of each service such as one or more servers, server systems and/or cloud platforms, or any combination of local, on-premises and/or remote hardware and/or software that is suitable for instantiating, hosting and/or executing at least a portion of the functionality of each service of the services platform.

In some embodiments, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

In some embodiments, the term "virtual machine (VM)" identifies at least one software component and/or a combination of at least one software component and at least one hardware component which are designed/programmed/configured to virtually emulate physical computer systems, such as, e.g., system virtual machines that provide a virtualization of a physical machine, a process virtual machine that is designed to execute computer programs in a virtual environment, or other duplication of real computing systems in a virtual environment. In some embodiments, the virtual machine(s) may employ sandboxes and/or containers for isolating each service of the services platform in order to ensure security and data privacy.

In some embodiments, the term "sandbox" and/or "container" identifies at least one software component and/or a combination of at least one software component and at least one hardware component which are designed/programmed/configured to manage/control untested and untrusted programs or code from, e.g., unverified, untrusted third parties, suppliers, users and/or websites, without risking harm to a host machine, such as a computing device, mobile computing device, server, cloud platform, or other devices and/or systems. As used herein, the term "sandbox" may include virtualization techniques to separate a program and or code from the host system to mitigate system failures and/or software vulnerabilities to prevent the program and/or code from harming the host system and/or device.

In some embodiments, an entity-specific platform 100 may interact with the common platform 200 from a common node 230 device in communication with the services platform 210. In some embodiments, the common node 230 may include any suitable computing device for communicating directly and/or over a network with the services platform 210. In some embodiments, a computing device may include or be incorporated, partially or entirely into at least one personal computer (PC), laptop computer, ultra-laptop computer, tablet, smartphone, wearable (e.g., smartwatch or other wearable computing device), touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, the common node 230 associated with a source entity-specific platform in an operation may provide to the services platform 210 operation parameters for the operation. In some embodiments, the source entity-specific platform may include an entity specific platform (e.g., the entity specific platform 100) that has tokens which are to be transferred to another entity-specific platform. In some embodiments, the operation parameters may include any suitable operation parameters as described above, such as, e.g., an operation type, a source encrypted storage address, a source encrypted storage name, a destination encrypted storage address, a destination encrypted storage name, an operation quantity and/or value, an operation frequency (e.g., for automatic recurring operations), among other operation parameters or any combination thereof.

In some embodiments, the operation parameters may include updates and/or modifications to one or more encrypted storages, e.g., via user interaction with the entity-specific platform. Upon receiving the updates and/or modifications, the history service 203 may query the platform database(s) 240 to provide the update. In some embodiments, the history service 203 may specify the user, e.g., via a user identifier and/or the address of the encrypted storage (e.g., the encrypted storage 121), and the metadata and/or data associated with the user interaction that affects the encrypted storage. In some embodiments, the query may cause a record, such as an entry in the table, to be updated with the metadata and/or data to update the address.

In some embodiments, the common node(s) 230 may interface with a name service 201 of the services platform 210. In some embodiments, the name service 201 may provide an interface between the common node(s) 230 and a name service manager 211 to manage a domain name associated with a specified encrypted storage. For example, the user may select or otherwise input data to interact with an encrypted storage of another user, such as, e.g., to transfer data from the first encrypted storage 221a (e.g., of the source entity-specific platform) to the second encrypted storage 221b (e.g., of the destination entity-specific platform) according to the addresses specified by the operation parameters.

In some embodiments, the name service manager 211 may utilize and/or modify the metadata and/or data for the address of each encrypted storage to define domain names and/or identify the source and destination of operations across the distributed crypto-ledger 220 and/or ecosystem. In some embodiments, the name service manager 211 may serve as a persistor of the address book records that maps names to addresses, e.g., using metadata, and maps addresses to names, e.g., using metadata. Accordingly, in some embodiments, the name service manager 211 may be a local proxy for a global name service, such as for the Ethereum name service (ENS) or other ecosystem-wide name service. In some embodiments, the name service manager 211 may be a local and/or global name service.

In some embodiments, the name service manager 211 may establish a unique name convention for the common platform 200 and/or across all entity-specific platforms in the ecosystem. For example, the name convention may be a hierarchical structure specifying the entity and/or entity-specific platform of each of the first encrypted storage 221a and second encrypted storage 221b, a name and/or domain name and/or user identifier associated with the entity-specific platform of each encrypted storage 221a/221b, and/or a token/crypto-token/crypto-coin name associated with the entity-specific platform of the particular encrypted storage. An example naming structure may include, e.g., <ENTITY>.<ENCRYPTED STORAGE NAME>.<ENTITY-SPECIFIC COIN>, among other variations and/or combinations of identifying features of the particular encrypted storage.

In some embodiments, upon first creating each encrypted storage 221a/221b, the name service 201 may address the encrypted storage 221a/221b on the distributed crypto-ledger 220. In some embodiments, the name service 201 may produce an instruction to the name service manager 211 to map a user provided name (e.g., domain name, user name, etc.) to an address. In some embodiments, the name service manager 211 may reference the address book imported by the address service 217 to determine an availability of the user provided name. In some embodiments, the address may be a cryptographically generated address as described above, e.g., based on a public key and/or private key associated with the common node 230 device, or an IP address associated with the common node 230 device or any combination thereof.

In some embodiments, creating the address may include the name service manager 211 instructing the address service 217 to add a record in the address book of the platform database(s) 240 for the address-name mapping of each encrypted storage. In some embodiments, the name service manager 211 and/or the history service 203 may utilize the user input to update the address book with data and/or metadata associated with each encrypted storage, such as, e.g., user data (e.g., identity and/or credential data), a public key, a time of creation, a date of creation, among other data and/or metadata.

In some embodiments, the name service manager 211 may interface with a name registry 222 to register a new name on the distributed crypto-ledger 220. In some embodiments, the name registry 222 may include a registrar, which may be, e.g., a smart contract, that controls the top level domain of the name registry 222. In some embodiments, the registrar automatically records in the name registry 222 ownership of a name, e.g., according to the mappings between the name and the address of the first encrypted storage 221a and/or the second encrypted storage 221b. In some embodiments, the registrar may record a name to address mapping, an address to name mapping, or both, such that the name registry 222 may correlate a provided name and/or provided address with a particular encrypted storage within the top level domain. In some embodiments, the top level domain may be set according to the hierarchical scheme described above, e.g., a domain associated with the common platform 200 and/or an entity-specific platform (e.g., the entity-specific platform 100) and/or the distributed crypto-ledger 220.

Accordingly, in some embodiments, each entity-specific platform and the common platform 200 in the ecosystem may have a name registry associated with the top level domain of each entity-specific platform. Thus, each name registry of each entity-specific platform may provide the registry of name and address mappings within the associated distributed crypto-ledger. As a result, when locating a particular encrypted storage, a message may be directed to the associated entity-specific platform within the ecosystem of entity-specific platforms based on the top level domain, and then the associated entity-specific platform may direct the message to the encrypted storage based on the name registry of the associated entity-specific platform.

In some embodiments, the name registry 222, platform database(s) 240 and/or the name service manager 211 of the services platform 210 enables a user to initiate operations between the encrypted storages on different entity-specific platforms. In some embodiments, the operation parameters for the operation may be conveyed to the common platform 200 by the common node(s) 230 associated with the entity-specific platform of the user. The operation parameters may include, e.g., the name and/or address of the user's encrypted storage, a name and/or address of an encrypted storage of another user, an operation type indicative of the type of operation to be performed, an operation quantity indicative of a quantity of data and/or data items associated with the operation (e.g., files, number of files, number of tokens, value of tokens, number of characters/digits, number of words, etc.), a payload of the operation (e.g., the file(s), token(s), character(s), digit(s), word(s) or any combination thereof to be employed in the operation), a date and/or time to execute the operation, a recurring period for executing the operation on a recurring basis, among other parameters or any combination thereof.

In some embodiments, the services platform 210 may receive the operation parameters and execute the operation. In some embodiments, the name service 201 may extract the operation parameters including the names of the encrypted storages associated with the operation. In some embodiments, the name service manager 211 may utilize the name registry 222 to identify the address mapped to each name to determine a source encrypted storage and a destination encrypted storage for the operation based on the name and/or address of each user. For example, the first encrypted storage 221a may be the source encrypted storage associated with a first user on a first entity-specific platform, and the second encrypted storage 221b may be the destination encrypted storage associated with a second user on a second entity-specific platform. As described above, the top level domain name in the addressing scheme may identify an associated entity-specific platform. Accordingly, the services platform 210 may use the name service manager 211 and name registry 222 to identify the first encrypted storage 221a as the source encrypted storage, and the second encrypted storage 221b as the destination encrypted storage based on the top level domain names the first and second entity-specific platforms.

In some embodiments, a client gateway 202 may provide an interface for communications from the common node(s) 230. In some embodiments, the client gateway 202 serves as an access point to the services platform 210, and may involve a change of addressing, forwarding packets between networks with different network prefixes. The networking software stack of each device contains a routing table that specifies which interface is used for transmission and which router on the network is responsible for forwarding to a specific set of addresses. If none of these forwarding rules is appropriate for a given destination address, the client gateway 202 is chosen as the router of last resort. The default gateway can be specified by the route command to configure the node's routing table and default route.

In some embodiments, the client gateway 202 may route the operation parameters to a client port 216. In some embodiments, a "port" refers to a communication endpoint. In some embodiments, the port can take the form of a logical construct at a software level that identifies a specific process or a type of network service. In some embodiments, a port is identified for each transport protocol and address combination by a port number, such as, e.g., 26-bit unsigned number. Examples of ports may include, e.g., File Transfer Protocol (FTP) data transfer (Port 20), FTP command control (Port 21), Secure Shell (SSH) secure login (Port 22), Telnet remote login service (Port 23), Simple Mail Transfer Protocol (SMTP) E-mail routing (Port 25), Domain Name System (DNS) service (Port 53), Dynamic Host Configuration Protocol (DHCP) (Port 67 or 68), Hypertext Transfer Protocol (HTTP) used in the World Wide Web (Port 80), Post Office Protocol (POP3) (Port 210), Network News Transfer Protocol (NNTP) (Port 219), Network Time Protocol (NTP) (Port 223), Internet Message Access Protocol (IMAP) (Port 243), Simple Network Management Protocol (SNMP) (Port 261), Internet Relay Chat (IRC) (Port 294), HTTP Secure (HTTPS) HTTP over TLS/SSL (Port 443), among others. Thus, the client port 216 may serve as the endpoint to communications from the common node 230 device.

The client port 216 may extract the operation parameters from the instruction to formulate a command to the services platform 210. Accordingly, the client port 216 may make the operation parameters available for the services platform 210 to execute the operation. In some embodiments, the instruction may include structured data specifying the operation parameters according to a predefined format, e.g., using comma-separated values, a data table, array, vector, or other suitable data type or any combination thereof. Thus, the client port 216 may extract the operation parameters based on the values defined by the structured data. In some embodiments, the instruction may employ unstructured data, in which case the client port 216 may employ a parse engine to parse the instruction and extract the operation parameters. The parse engine may include, e.g., natural language processing, keyword detection, among other parsing models and algorithms or any combination thereof.

In some embodiments, the client port 216 may direct operation parameters to an operation writer 213. In some embodiments, the operation writer 213 uses the operation parameters to write to the distributed crypto-ledger 220 using a common inter-operability smart contract 223 based on the source and destination encrypted storages identified by the name service manager 211 and name registry 222. In some embodiments, based on an operation parameter define an operation type, the operation writer 213 may cause the distributed crypto-ledger 220 to initiate a common inter-operability smart contract 223 for performing the operation between the first encrypted storage 221*a* as the source encrypted storage and the second encrypted storage 221*b* as the destination encrypted storage.

In some embodiments, a token deposit operation may trigger a smart contract for minting tokens (e.g., producing new tokens on the distributed crypto-ledger 220), and thus adding the tokens to the first encrypted storage 221*a*. In some embodiments, a token transfer operation may then trigger the common inter-operability smart contract 223 to use one or more additional smart contracts and/or functions within the common inter-operability smart contract 223 to move tokens from the first encrypted storage 221*a* (the source encrypted storage) to the second encrypted storage 221*b* (the destination encrypted storage).

In some embodiments, a token redeem operation may cause a smart contract for burning tokens (e.g., erasing tokens from the blockchain), and thus removing the tokens from the second encrypted storage 221*b* to enable the tokens to be reproduced on the entity-specific platform associated with the destination of the operation based on the addressing. As a result, the common inter-operability smart contract 223 and/or the services platform 210 may enable tokens to be converted from the source entity-specific platform for minting on the first encrypted storage 221*a* on the distributed crypto-ledger to transfer the converted tokens to the second encrypted storage 221*b* of the destination entity-specific platform. The converted tokens may then be burned and reproduced on the destination entity-specific platform to enable the transfer of tokens from the source entity-specific platform to the destination entity-specific platform for ultimate distribution to the recipient according to the operation parameters.

In some embodiments, an operation monitor 212 may monitor the activity of the common inter-operability smart contract 223 to identify incoming operations, such as tokens transferred between encrypted storages or the minting of converted tokens for addition to a source encrypted storage.

Accordingly, the common platform 200 provides inter-operability functionality to enable operations between multiple entity-specific platforms via a synchronized name registry 222 and the common inter-operability smart contract 223 for effectuating the conversion of tokens for deposit and redemption processes attributable to associated entity-specific platforms. As a result, token values on each entity-specific platform and the common platform 200 may or may not be equivalent. In some embodiments, the common inter-operability smart contract 223 may identify an equivalency between the tokens of the first or source entity-specific platform to mint a quantity of tokens having equivalent value on the distributed crypto-ledger 220, which may be deposited into the first encrypted storage 221*a*. Upon transfer to the second encrypted storage 221*b*, the common inter-operability smart contract 223 may similarly determine a token quantity on the second entity-specific platform associated with the second encrypted storage 221*b* that has an equivalent value. The tokens may then be withdrawn form the second encrypted storage 221*b* and burned such that the equivalent value may be then be minted on the second entity-specific platform.

Figure 3:
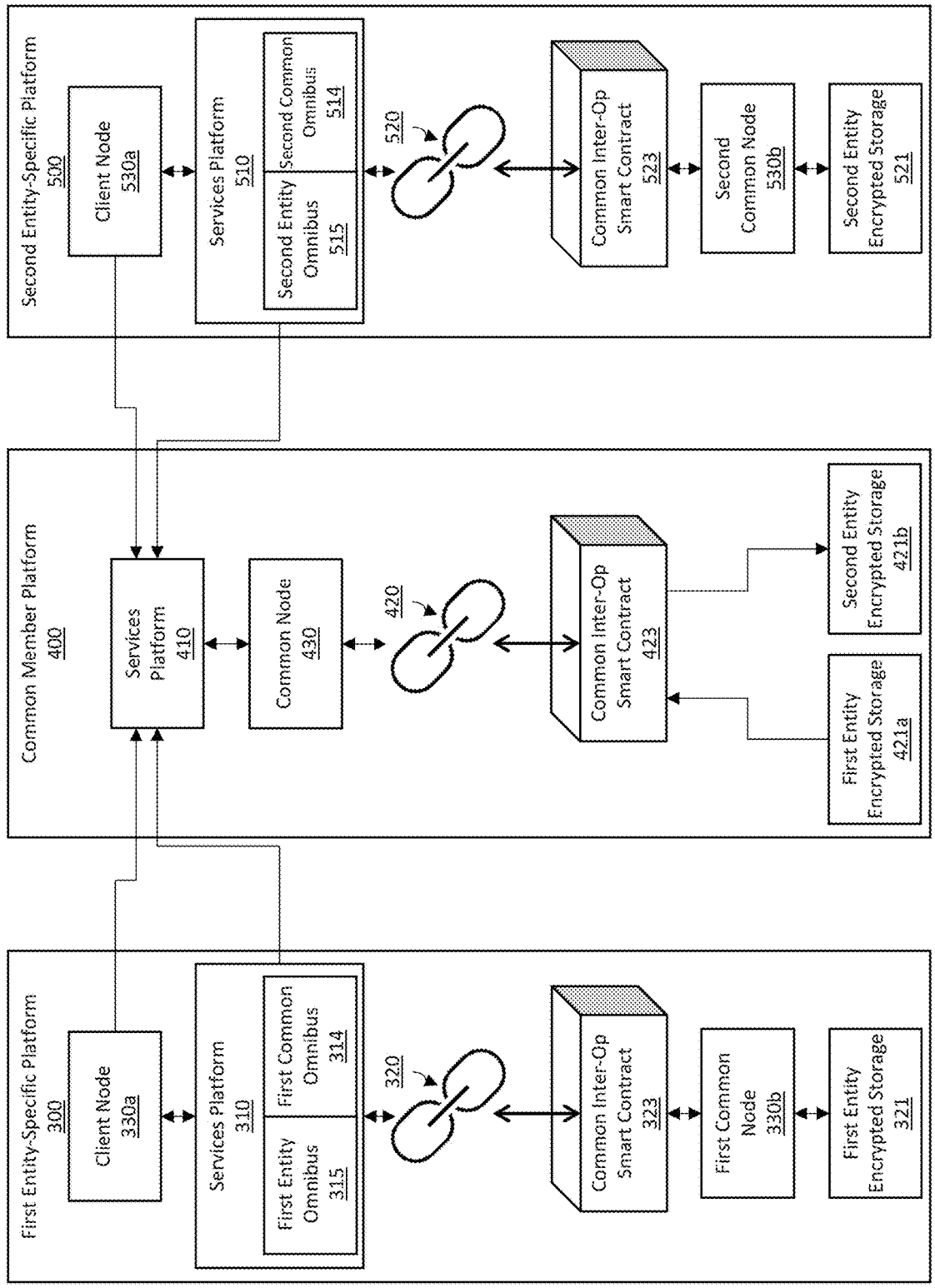
FIG. 3 is a block diagram of another exemplary computer-based system and platform for a common member platform 400 designed to provide interoperability between at least a first entity-specific platform 300 and a second entity-specific platform 500 in accordance with one or more embodiments of the present disclosure.
Figure 4:
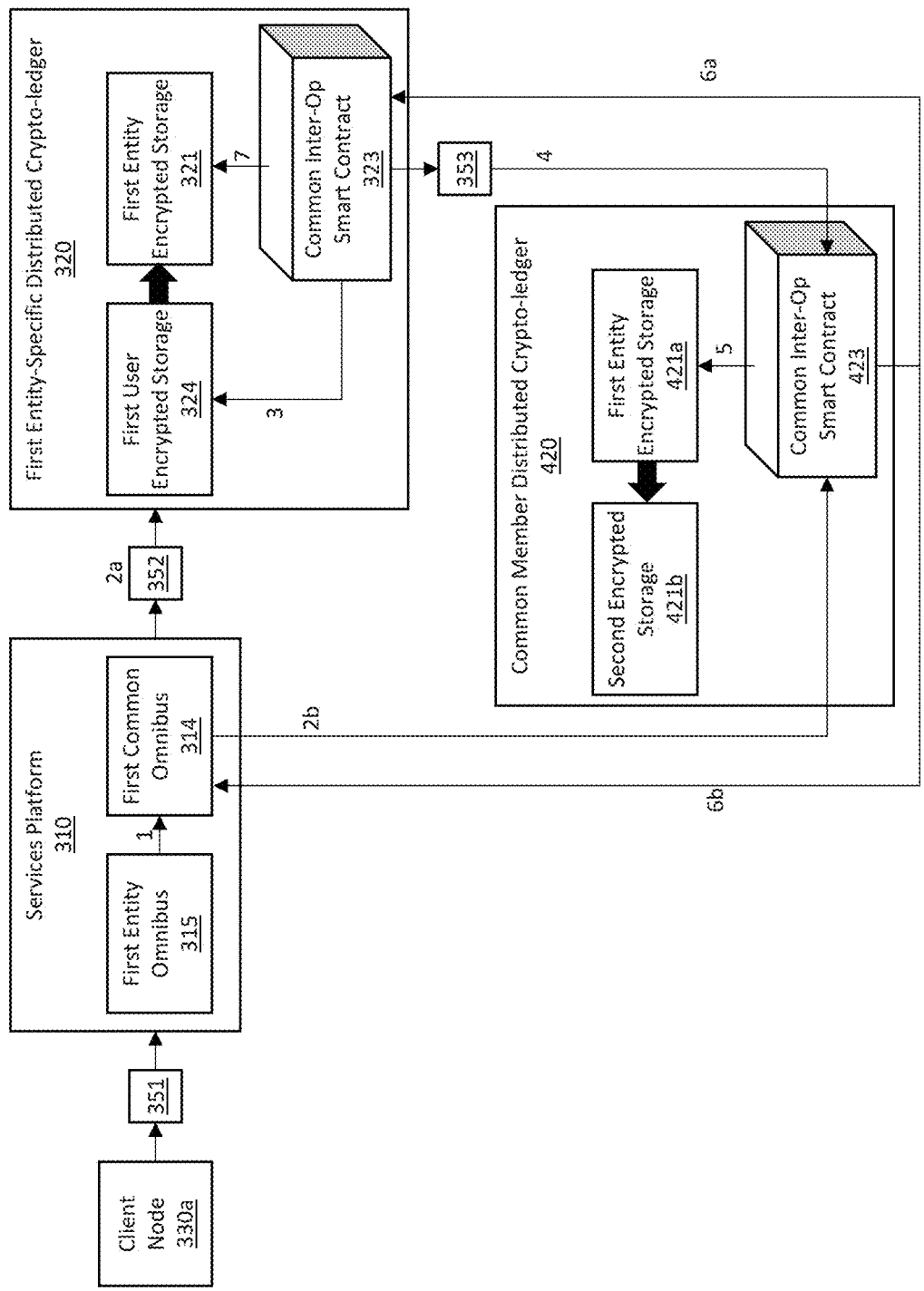
FIG. 4 illustrates a flowchart of an illustrative methodology for a common member platform 400 designed to provide interoperability between at least a first entity-specific platform 300 and a second entity-specific platform 500 in accordance with one or more embodiments of the present disclosure.
Figure 5:
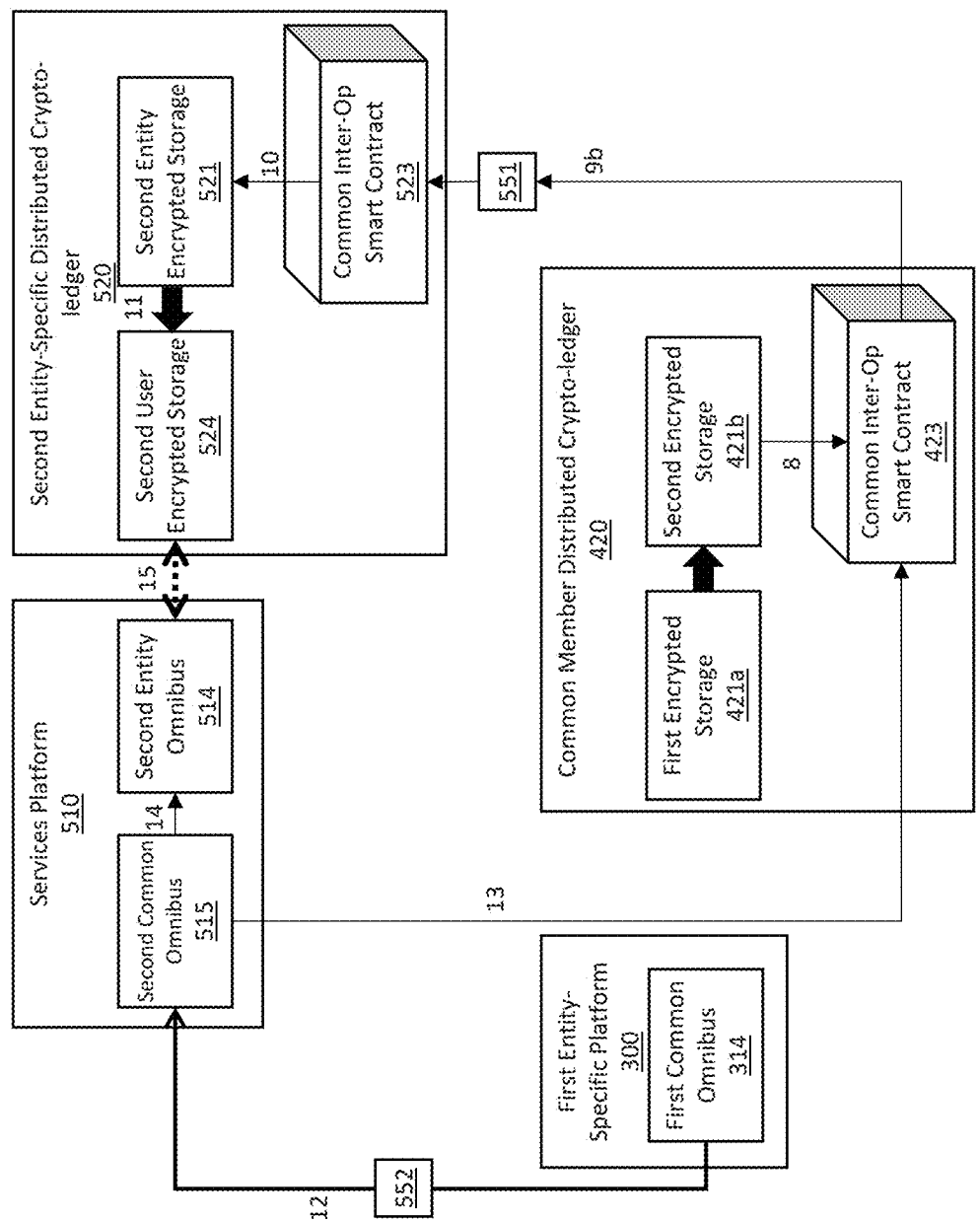
FIG. 5 illustrates a flowchart of an illustrative methodology for a common member platform 400 designed to provide interoperability between at least a first entity-specific platform 300 and a second entity-specific platform 500 in accordance with one or more embodiments of the present disclosure.

FIGS. 3 through 5 are block diagrams of another exemplary computer-based system and platform for a common member platform 400 designed to provide interoperability between at least a first entity-specific platform 300 and a second entity-specific platform 500 in accordance with one or more embodiments of the present disclosure.

In some embodiments, a first user may initiate an operation with a second user via a client node 330*a* on the first entity-specific platform 300. In some embodiments, the client node 330*a* may communicate an instruction 351 with operation parameters including, e.g., a first encrypted storage identifier identifying, e.g., by domain name and/or address, an encrypted storage associated with the first user, a second encrypted storage identifier identifying, e.g., by domain name and/or address, an encrypted storage associated with the second user, and an asset quantity to be transferred from the first user to the second user.

In some embodiments, the services platform 310, at step 1 may transfer the asset quantity associated with the operation parameters from a first entity omnibus 315 to a first common omnibus 314. The services platform 310 may, before, after or during the transfer of the asset quantity, determine a first quantity of tokens associated with the asset quantity.

In some embodiments, the services platform 310, at step 2*a* may issue an operation instruction 352 to first entity-specific distributed crypto-ledger 320 with the operation parameters including the first quantity of tokens to trigger a transfer of the first quantity of tokens from the first user encrypted storage 324 to the second user encrypted storage 524 via a first entity-specific distributed crypto-ledger 320, a common member distributed crypto-ledger 420 and a second entity-specific distributed crypto-ledger 520. In some embodiments, the first encrypted storage identifier may identify via a suitable addressing scheme, the location of the first user encrypted storage 324 as a particular address location on the first entity-specific distributed crypto-ledger 320. Similarly, the second encrypted storage identifier may identify via a suitable addressing scheme, the location of the second user encrypted storage 524 as a particular address location on the second entity-specific distributed crypto-ledger 520.

In some embodiments, a common inter-operability smart contract 323 on the first entity-specific distributed crypto-ledger 320 uses the operation parameters to identify a user encrypted storage 324 based on a first encrypted storage identifier (e.g., using a name registry as described above). In some embodiments, the common inter-operability smart contract 323 may determine a first quantity of tokens in the first user encrypted storage 324 that represents an equivalence to the asset quantity. In some embodiments, the tokens may include, e.g., a stablecoin, and thus may represent a consistent ratio of quantity of tokens to asset quantity. However, in some embodiments, the tokens can include any suitable digital token, such as, e.g., Bitcoin, Ether, Dogecoin, Non-Fungible Token (NFT), among others or any combination thereof.

Accordingly, in some embodiments, the common inter-operability smart contract 323 causes a withdrawal of the first quantity of tokens for the operation based on the operation parameters to represent the withdrawal of the asset quantity from the first entity omnibus 315. In some embodiments, at step 3, the common inter-operability smart contract 323 causes the first user encrypted storage 324 to transfer the first quantity of tokens from a first user encrypted storage 324 to a first entity encrypted storage 321 on the first entity-specific distributed crypto-ledger 320. The first entity-encrypted storage is associated with the first entity-specific platform 300.

In some embodiments, the services platform 310, at step 2b, may issue notification to a common inter-operability smart contract 423 of the common member distributed crypto-ledger 420 indicating the movement of the asset quantity into the first common omnibus 314. In some embodiments, the notification may include an indication of the asset quantity and a first entity identifier that identifies the first common omnibus 314 as being associated with the first entity. In some embodiments, the common inter-operability smart contract 423 may initiate a minting of a second quantity of tokens having equivalent value on the common member distributed crypto-ledger 420 to the asset quantity, and thus an equivalent value to the first quantity of tokens. In some embodiments, step 2b may occur in parallel with step 2a. Thus, the services platform 310 may issue both the notification and the operation instruction 352 in response to the movement of the asset quantity from the first entity omnibus 315 to the first common omnibus 314.

Upon determining that the transfer of the first quantity of tokens is complete, the common inter-operability smart contract 323 may, at step 4, issue a first instruction 353 to the common member distributed crypto-ledger 420 to convey the operation parameters and initiate a movement of the second quantity of tokens from the first entity-specific platform 300 to the second entity-specific platform 500. To do so, the first instruction 353 may provide the operation parameters to a common inter-operability smart contract 423 on the common member distributed crypto-ledger 420 of the common member platform 400 to initiate a movement of the second quantity of tokens from the first entity encrypted storage 421a to the second entity encrypted storage 421b based on the operation parameters.

In some embodiments, the second quantity of tokens is described here as being minted in response to the step 2b notification, thus separating the triggers for the minting of the second quantity of tokens and the transfer of the second quantity of tokens. In some embodiments, the minting of the second quantity of tokens and the transfer of the second quantity of tokens may both be triggered by the first instruction 353 according to the operation parameters. In some embodiments, the minting of the second quantity of tokens and the transfer of the second quantity of tokens may both be triggered by the notification of step 2b according to the operation parameters conveyed by the notification.

In some embodiments, the common inter-operability smart contract 423 may then use the addresses and/or names associated with the first user and the second user to identify the top level domain name of the entity-specific platforms associated with the first user and the second user (the first entity-specific platform 300 and the second entity-specific platform 500, respectively). Thus, the common inter-operability smart contract 423 may identify a first entity encrypted storage 421a associated with the first entity-specific platform 300 and a second entity encrypted storage 421b associated with the second entity-specific platform 500. The common inter-operability smart contract 423 may then, at step 5, move the second quantity of tokens to the second entity by minting the second quantity of tokens in the first entity encrypted storage 421a and transfer the second quantity of tokens to the second encrypted storage 421b.

In some embodiments, upon completion of the transfer of the second quantity of tokens to the second encrypted storage 421b, the common inter-operability smart contract 423 may return, at step 6a, a confirmation of the transfer to the common inter-operability smart contract 323. In some embodiments, in response to the confirmation, the common inter-operability smart contract 323 may, at step 7, trigger a burn function to burn the first quantity of tokens from the first encrypted storage 321, thereby completing the withdrawal of the first quantity of tokens from the first entity-specific platform 300.

In some embodiments, upon completion of the transfer of the second quantity of tokens to the second encrypted storage 421b, the common inter-operability smart contract 423 may also return, at step 6b, a confirmation of the transfer to the common omnibus 314. In some embodiments, the services platform 310 may utilize the confirmation to mark the asset quantity for a parallel transfer of the asset quantity directly to the second entity-specific platform 500. In some embodiments, the parallel transfer may occur immediately or at a later time, e.g., based on a periodic schedule, predetermined time, predetermine lag, or other delay or any combination thereof.

In some embodiments, the common inter-operability smart contract 423 may determine, at step 8, that the second encrypted storage 421b as received the second quantity of tokens. Accordingly, the common inter-operability smart contract 423 may send a second instruction 551 at step 9 to the second entity-specific platform 500 to redeem the second quantity of tokens on the second entity-specific distributed crypto-ledger 520. In some embodiments, the second instruction 551 may include the operation parameters and an indication of the second quantity of tokens.

In some embodiments, the common inter-operability smart contract 523 may receive the second instruction 551. Upon receiving the second instruction 551, the common inter-operability smart contract 523 may determine an address of the second user encrypted storage 524 associated with the second user based on the second encrypted storage identifier (e.g., using a name registry as described above). In some embodiments, the common inter-operability smart contract 523 may also determined a third quantity of tokens that have an equivalent value to the second quantity of tokens. The common inter-operability smart contract 523 may then redeem the second quantity of tokens may minting in the second entity storage 521 the third quantity of tokens. Thus, the second quantity of tokens are removed from the common member distributed crypto-ledger 420 and converted to tokens added to the second entity-specific distributed crypto-ledger 520.

In some embodiments, at step 10, upon minting the third quantity of tokens, the common inter-operability smart contract 523 may execute transfer of the third quantity of tokens to the second user encrypted storage 524. Thus, the operation may be completed by using the common member distributed crypto-ledger 420 to convert and move tokens between the first entity-specific distributed crypto-ledger 320 and the second entity-specific distributed crypto-ledger 520.

In some embodiments, in parallel, the first entity-specific platform 300 may transfer the asset quantity from the first common omnibus 314 to a second common omnibus 515 in the services platform 510 of the second entity-specific platform 500. In some embodiments, the asset quantity may be transferred via the parallel transfer at step 12 as an asset transfer 552. In some embodiments, asset transfers 552, such as, e.g., wire transfers, bank transfers, physical transfers, among other asset transfers 552 may be slow, expensive and computationally inefficient to perform one at a time. Thus, by using the asset transfer 552 in parallel with the platforms 300, 400 and 500 and associated distributed crypto-ledgers 320, 420 and 520, the asset transfers 552 may be delayed and aggregated for more efficient batch transfers while enabling real time operations with the assets via the distributed crypto-ledgers 320, 420 and 520.

In some embodiments, upon the asset transfer 552 completing and providing the asset quantity to the second common omnibus 515, the services platform 510 may provide, at step 13, to the common inter-operability smart contract 423 a notification of the completion of the asset transfer 552. In some embodiments, the notification of step 13 may cause the common inter-operability smart contract 423 to burn the second quantity of tokens from the common member distributed crypto-ledger 420 to withdraw the second quantity of tokens from the second encrypted storage 421b. While the completion of the asset transfer 552 is described here as triggering the burning of the second quantity of tokens, in some embodiments, before, after or during sending the second instruction 551, the common inter-operability smart contract 423 may burn the second quantity of tokens from the common member distributed crypto-ledger 420 to withdraw the second quantity of tokens from the second encrypted storage 421b.

Accordingly, the second common omnibus 515 may receive the asset transfer 552 and move the asset quantity at step 13 to the second entity omnibus 514 for provision to the second user. In some embodiments, the asset quantity may be compared at step 14 with the third quantity of tokens to verify both the third quantity of tokens and the asset quantity, thus ensuring security of the operation and the asset transfer 552.

Figure 6:
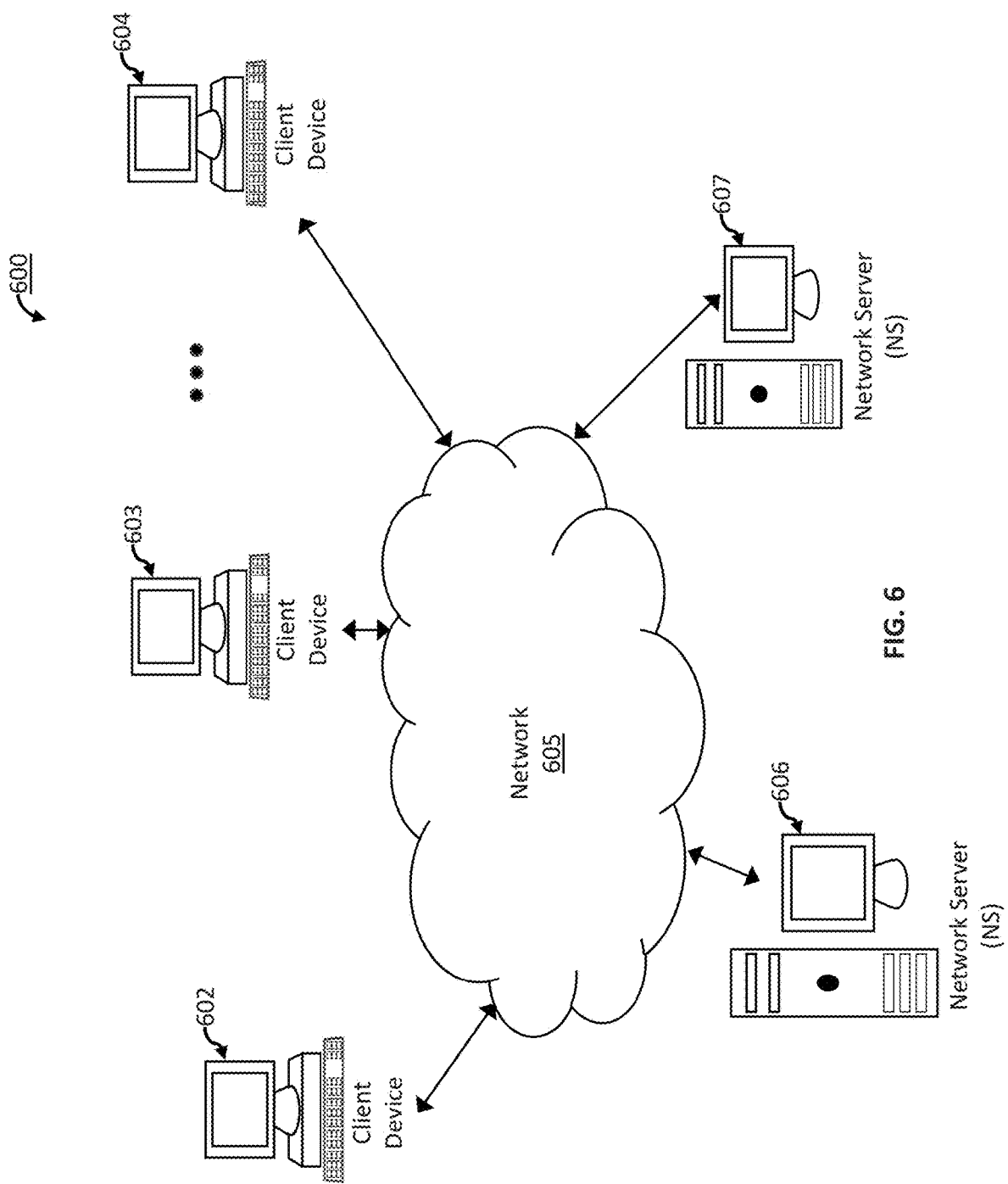
FIG. 6 depicts a block diagram of an exemplary computer-based system and platform 600 for multi-blockchain interoperability in accordance with one or more embodiments of the present disclosure.

FIG. 6 depicts a block diagram of an exemplary computer-based system and platform 600 for multi-blockchain interoperability in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 600 may be configured to manage a large number of members and concurrent transactions, as detailed herein. In some embodiments, the exemplary computer-based system and platform 600 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 6, member computing device 602, member computing device 603 through member computing device 604 (e.g., clients) of the exemplary computer-based system and platform 600 may include virtually any computing device capable of receiving and sending a message over a network (e.g., cloud network), such as network 605, to and from another computing device, such as servers 606 and 607, each other, and the like. In some embodiments, the member devices 602-604 may be personal computers, multiprocessor systems, microprocessor-based or programmable consumer electronics, network PCs, and the like. In some embodiments, one or more member devices within member devices 602-604 may include computing devices that typically connect using a wireless communications medium such as cell phones, smart phones, pagers, walkie talkies, radio frequency (RF) devices, infrared (IR) devices, GB-s citizens band radio, integrated devices combining one or more of the preceding devices, or virtually any mobile computing device, and the like. In some embodiments, one or more member devices within member devices 602-604 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 602-604 may include may run one or more applications, such as Internet browsers, mobile applications, voice calls, video games, videoconferencing, and email, among others. In some embodiments, one or more member devices within member devices 602-604 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 602-604 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 602-604 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 605 may provide network access, data transport and/or other services to any computing device coupled to it. In some embodiments, the exemplary network 605 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 605 may include and implement, as an alternative or in conjunction with one or more of the above, a WiMAX architecture defined by the WiMAX forum. In some embodiments and, optionally, in combination of any embodiment described above or below, the exemplary network 605 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 605 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 605 may also include mass storage, such as network attached storage (NAS), a storage area network (SAN), a content delivery network (CDN) or other forms of computer or machine readable media.

In some embodiments, the exemplary server 606 or the exemplary server 607 may be a web server (or a series of servers) running a network operating system, examples of which may include but are not limited to Apache on Linux or Microsoft IIS (Internet Information Services). In some embodiments, the exemplary server 606 or the exemplary server 607 may be used for and/or provide cloud and/or network computing. Although not shown in FIG. 6, in some embodiments, the exemplary server 606 or the exemplary server 607 may have connections to external systems like email, SMS messaging, text messaging, ad content providers, etc. Any of the features of the exemplary server 606 may be also implemented in the exemplary server 607 and vice versa.

In some embodiments, one or more of the exemplary servers 606 and 607 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 601-604.

In some embodiments and, optionally, in combination of any embodiment described above or below, for example, one or more exemplary computing member devices 602-604, the exemplary server 606, and/or the exemplary server 607 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 7:
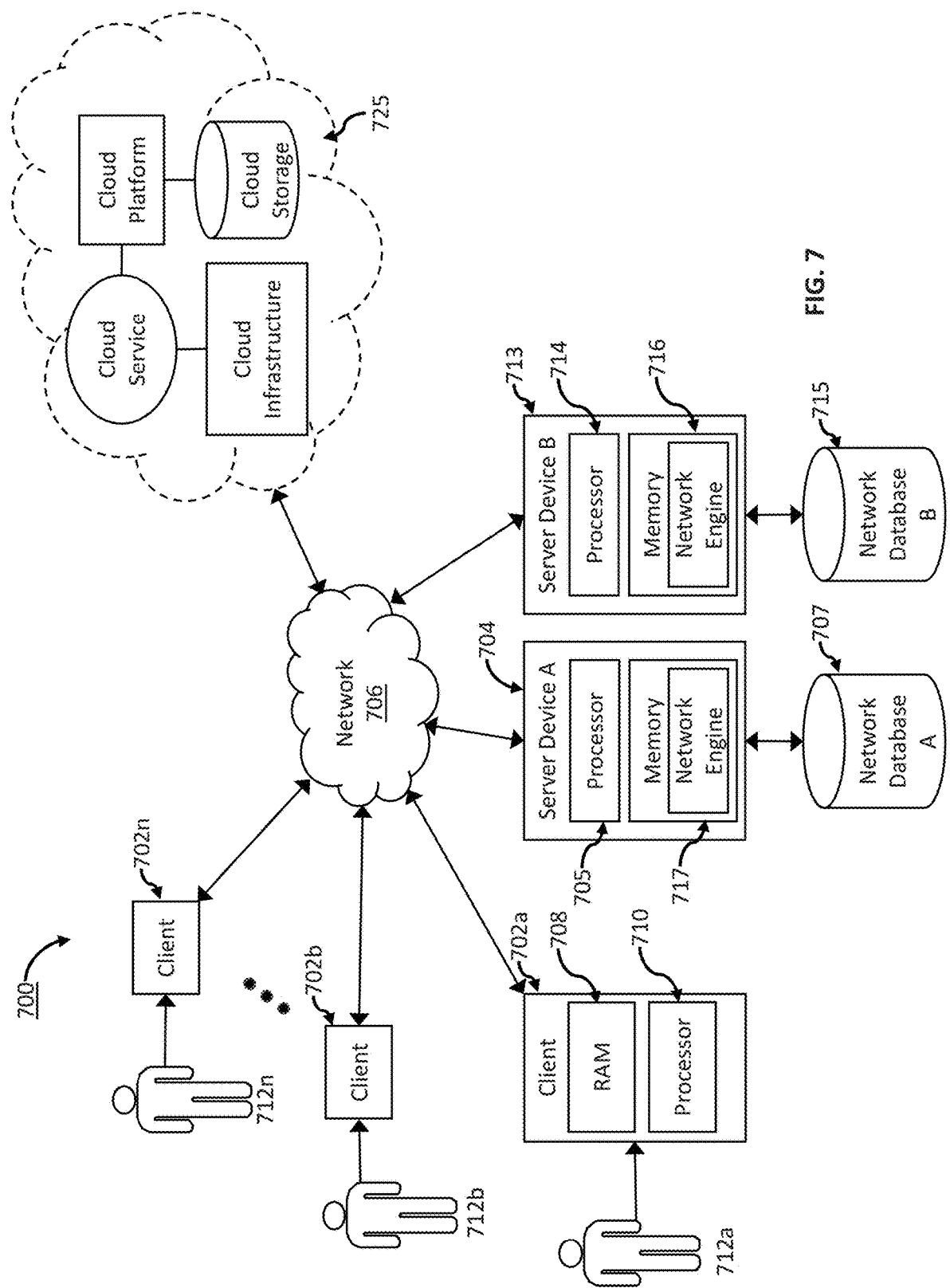
FIG. 7 depicts a block diagram of another exemplary computer-based system and platform 700 for multi-blockchain interoperability in accordance with one or more embodiments of the present disclosure.

FIG. 7 depicts a block diagram of another exemplary computer-based system and platform 700 for multi-blockchain interoperability in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 702a, member computing device 702b through member computing device 702n shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, and/or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of client 702a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 702a through 702n may also comprise a number of external or internal devices such as a mouse, a CD-ROM, DVD, a physical or virtual keyboard, a display, or other input or output devices. In some embodiments, examples of member computing devices 702a through 702n (e.g., clients) may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, member computing devices 702a through 702n may be specifically programmed with one or more application programs in accordance with one or more principles/methodologies detailed herein. In some embodiments, member computing devices 702a through 702n may operate on any operating system capable of supporting a browser or browser-enabled application, such as Microsoft™ Windows™, and/or Linux. In some embodiments, member computing devices 702a through 702n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 702a through 702n, user 712a, user 712b through user 712n, may communicate over the exemplary network 706 with each other and/or with other systems and/or devices coupled to the network 706. As shown in FIG. 7, exemplary server devices 704 and 713 may include processor 705 and processor 714, respectively, as well as memory 717 and memory 716, respectively. In some embodiments, the server devices 704 and 713 may be also coupled to the network 706. In some embodiments, one or more member computing devices 702a through 702n may be mobile clients.

In some embodiments, at least one database of exemplary databases 707 and 715 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
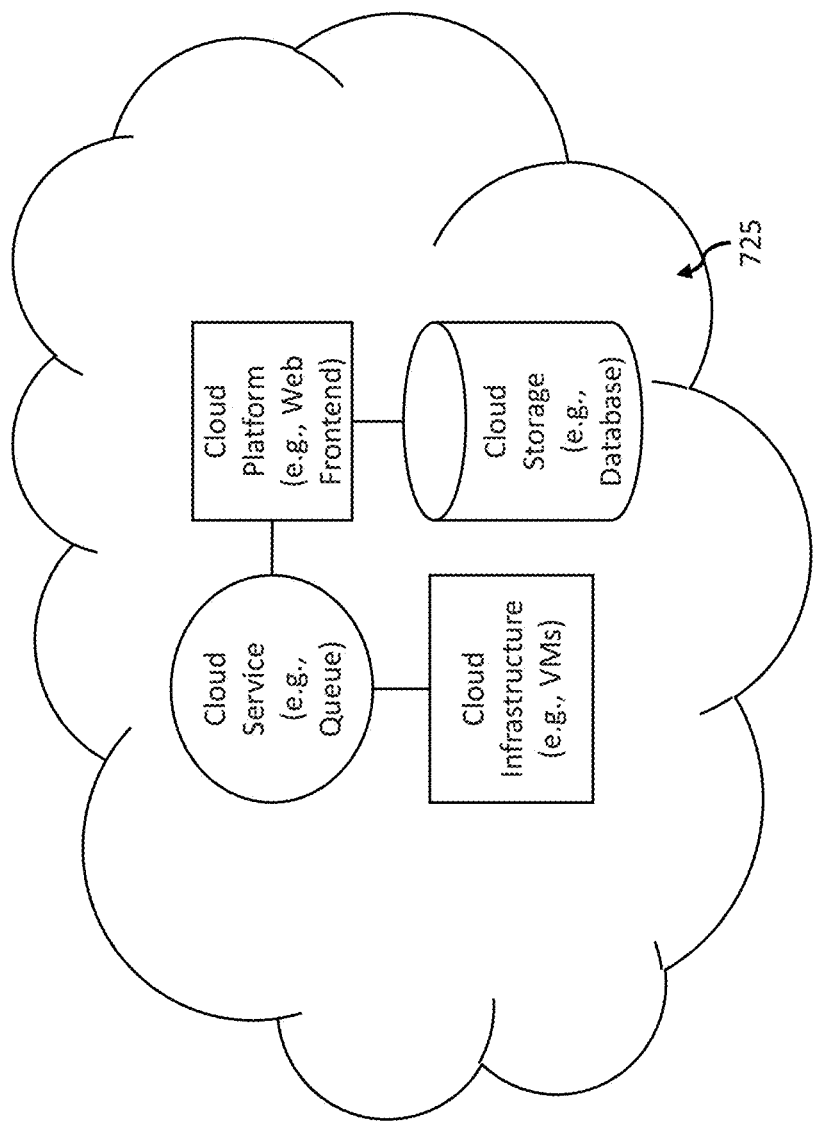
FIG. 8 illustrates schematics of an exemplary implementation of the cloud computing/architecture(s) in which the exemplary inventive computer-based systems/platforms for multi-blockchain interoperability of the present disclosure may be specifically configured to operate in accordance with one or more embodiments of the present disclosure.
Figure 9:
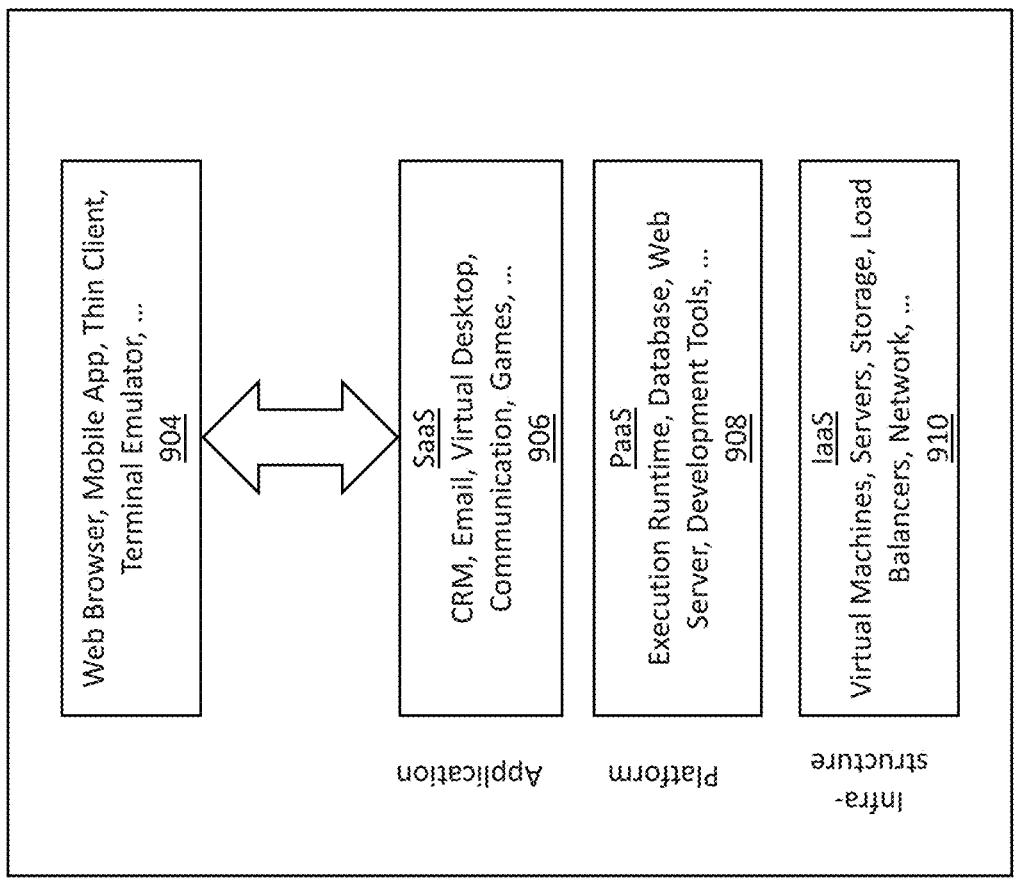
FIG. 9 illustrates schematics of an exemplary implementation of the cloud computing/architecture(s) in which the exemplary inventive computer-based systems/platforms for multi-blockchain interoperability of the present disclosure may be specifically configured to operate in accordance with one or more embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/ architecture 725 such as, but not limiting to: infrastructure a service (IaaS) 910, platform as a service (PaaS) 908, and/or software as a service (SaaS) 906 using a web browser, mobile app, thin client, terminal emulator or other endpoint 904. FIGS. 8 and 9 illustrate schematics of exemplary implementations of the cloud computing/architecture(s) in which the exemplary inventive computer-based systems/ platforms for multi-blockchain interoperability of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 20 cm or less. In some embodiments, the NFC may operate at 23.56 MHz on ISO/IEC 28000-3 air interface and at rates ranging from 206 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 200 (e.g., but not limited to, 200-999), at least 2,000 (e.g., but not limited to, 2,000-9, 999), at least 20,000 (e.g., but not limited to, 20,000-99, 999), at least 200,000 (e.g., but not limited to, 200,000-999, 999), at least 2,000,000 (e.g., but not limited to, 2,000,000-9,999,999), at least 20,000,000 (e.g., but not limited to, 20,000,000-99,999,999), at least 200,000,000 (e.g., but not limited to, 200,000,000-999,999,999), at least 2,000,000, 000 (e.g., but not limited to, 2,000,000,000-999,999,999, 999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

1. A method including:
   receiving, by a controller of a membered common distributed crypto-ledger, a first instruction to perform at least one operation between a first user, associated with a first entity-specific distributed crypto-ledger of a first entity, and a second user, associated with a second entity-specific distributed crypto-ledger of a second entity;
   where the first instruction includes:
      a first encrypted storage identifier that identifies a first encrypted storage associated with the first user and
      a second encrypted storage identifier that identifies a second encrypted storage associated with the second user;
   where the first entity is different from the second entity;
   where the first entity and the second entity are members of the membered common distributed crypto-ledger;
   where the first entity-specific distributed crypto-ledger of the first entity is operatively linked to the membered common distributed crypto-ledger via a first common encrypted storage, stored on a first common node of the membered common distributed crypto-ledger;

where the second entity-specific distributed crypto-ledger of the second entity is operatively linked to the membered common distributed crypto-ledger via a second common encrypted storage, stored on a second common node of the membered common distributed crypto-ledger;

where the first common encrypted storage is a first entity encrypted storage for all users of the first entity-specific distributed crypto-ledger;

where the second common encrypted storage is a second entity encrypted storage for all users of the second entity-specific distributed crypto-ledger;

determining, by the controller, a first quantity of first entity-specific crypto-tokens on the first entity-specific distributed crypto-ledger based at least in part on the at least one operation;

determining, by the controller, a second quantity of common crypto-tokens that is equivalent to the first quantity of the first crypto-tokens;

instructing, by the controller, the first common node to burn the first quantity of first entity-specific crypto-tokens from the first entity-specific distributed crypto-ledger;

instructing, by the controller, the membered common distributed crypto-ledger to mint the second quantity of the common crypto-tokens in the first common distributed crypto-ledger encrypted storage on the membered common distributed crypto-ledger;

instructing, by the controller, the membered common distributed crypto-ledger to move the second quantity of common crypto-tokens from the first common distributed crypto-ledger encrypted storage to a second common distributed crypto-ledger encrypted storage;

determining, by the controller, a third quantity of second entity-specific crypto-tokens that is equivalent to the second quantity of the common crypto-tokens;

instructing, by the controller, the second common node of the common distributed crypto-ledger to burn the second quantity of the common crypto-tokens from the second common distributed crypto-ledger encrypted storage;

instructing, by the controller, the second entity-specific distributed crypto-ledger to mint the third quantity of the second entity-specific crypto-tokens on the second entity-specific distributed crypto-ledger so as to convert the common crypto-tokens to the second entity-specific crypto-tokens; and returning, by the controller, a confirmation that confirms the at least one operation based at least in part on the third quantity of the at least one second crypto-token being minted in the second encrypted storage.

2. A system including:
a controller configured to perform steps to:
receive, from a membered common distributed crypto-ledger, a first instruction to perform at least one operation between a first user, associated with a first entity-specific distributed crypto-ledger of a first entity, and a second user, associated with a second entity-specific distributed crypto-ledger of a second entity;
where the first instruction includes:
a first encrypted storage identifier that identifies a first encrypted storage associated with the first user and
a second encrypted storage identifier that identifies a second encrypted storage associated with the second user;
where the first entity is different from the second entity;
where the first entity and the second entity are members of the membered common distributed crypto-ledger;
where the first entity-specific distributed crypto-ledger of the first entity is operatively linked to the membered common distributed crypto-ledger via a first common encrypted storage, stored on a first common node of the membered common distributed crypto-ledger;
where the second entity-specific distributed crypto-ledger of the second entity is operatively linked to the membered common distributed crypto-ledger via a second common encrypted storage, stored on a second common node of the membered common distributed crypto-ledger;
where the first common encrypted storage is a first entity encrypted storage for all users of the first entity-specific distributed crypto-ledger;
where the second common encrypted storage is a second entity encrypted storage for all users of the second entity-specific distributed crypto-ledger;
determine a first quantity of first entity-specific crypto-tokens on the first entity-specific distributed crypto-ledger based at least in part on the at least one operation;
determine a second quantity of common crypto-tokens that is equivalent to the first quantity of the first crypto-tokens;
instruct the first common node to burn the first quantity of first entity-specific crypto-tokens from the first entity-specific distributed crypto-ledger;
instruct the membered common distributed crypto-ledger to mint the second quantity of the common crypto-tokens in the first common distributed crypto-ledger encrypted storage on the membered common distributed crypto-ledger;
instruct the membered common distributed crypto-ledger to move the second quantity of common crypto-tokens from the first common distributed crypto-ledger encrypted storage to a second common distributed crypto-ledger encrypted storage;
determine a third quantity of second entity-specific crypto-tokens that is equivalent to the second quantity of the common crypto-tokens;
instruct the second common node of the common distributed crypto-ledger to burn the second quantity of the common crypto-tokens from the second common distributed crypto-ledger encrypted storage;
instruct the second entity-specific distributed crypto-ledger to mint the third quantity of the second entity-specific crypto-tokens on the second entity-specific distributed crypto-ledger so as to convert the common crypto-tokens to the second entity-specific crypto-tokens; and
return confirmation that confirms the at least one operation based at least in part on the third quantity of the at least one second crypto-token being minted in the second encrypted storage.

3. The method as recited in clause 1 and/or 2, further including:
accessing, by the controller, a user-entity registry including a mapping of encrypted storage identifiers enrolled with the membered common distributed crypto-ledger to entity-specific distributed crypto-ledgers enrolled with the membered common distributed crypto-ledger; and determining, by the controller, the second common distributed crypto-ledger encrypted storage based at least in part on the second encrypted storage identifier and the user-entity registry.

4. The method as recited in clause 1 and/or 2, further including:
utilizing, by the controller, a first interoperability smart contract to instruct the first common node to burn the first quantity of first crypto-tokens from the first encrypted storage; and
utilizing, by the controller, a second interoperability smart contract to instruct the second common node to mint the third quantity of second entity-specific crypto-tokens from the first encrypted storage.

5. The method as recited in clause 1, 2 and/or 4, where the first interoperability smart contract to further instructs the first common node to produce at least one operation record representing the at least one operation; and
where the at least one operation record includes the second encrypted storage identifier.

6. The method as recited in clause 1, 2, 4 and/or 5, further including:
receiving, by the controller, the at least one operation record from the first common node;
utilizing, by the controller, a common interoperability smart contract to mint the second quantity of the common crypto-tokens in the first common distributed crypto-ledger encrypted storage on the membered common distributed crypto-ledger; and
utilizing, by the controller, a common interoperability smart contract to instruct the membered common distributed crypto-ledger to move the second quantity of common crypto-tokens from the first common distributed crypto-ledger encrypted storage to the second common distributed crypto-ledger encrypted storage based at least in part on the at least one operation record.

7. The method as recited in clause 1, 2, 4, 5 and/or 6, where the common interoperability smart contract causes the membered common distributed crypto-ledger to create a membered common distributed crypto-ledger entry including the second quantity of common crypto-tokens and the at least one operation record.

8. The method as recited in clause 1 and/or 2, where the first entity-specific crypto-tokens include a first stablecoin;
where the second entity-specific crypto-tokens include a second stablecoin; and
where the common crypto-tokens include a third stablecoin.

9. The method as recited in clause 1 and/or 2, where the first instruction causes the first entity-specific crypto-ledger to move the first quantity of the first entity-specific crypto-tokens from the first encrypted storage to a first common node encrypted storage of the first common node.

10. The method as recited in clause 1 and/or 2, further including instructing, by the controller, the second entity-specific distributed crypto-ledger to move the third quantity of the second entity-specific crypto-tokens from a second common node encrypted storage of the second common node to the second encrypted storage.

11. The method as recited in clause 1 and/or 2, further including:
receiving, by the controller, a first notification indicative of the asset quantity being stored in a first common omnibus associated with the first entity;
instructing, by the controller, the membered common distributed crypto-ledger to mint the second quantity of the common crypto-tokens in the first common distributed crypto-ledger encrypted storage on the membered common distributed crypto-ledger based on the notification so as to create in the first common distributed crypto-ledger encrypted storage the second quantity of the common crypto-tokens based on the asset quantity;
receiving, by the controller, a second notification indicative of the asset quantity being received by a second common omnibus associated with the second entity; and
instructing, by the controller, the second common node of the common distributed crypto-ledger to burn the second quantity of the common crypto-tokens from the second common distributed crypto-ledger encrypted storage in response to the second notification.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A method comprising:
receiving, by a controller of a membered common distributed crypto-ledger, a first instruction to perform at least one operation between a first user, associated with a first entity-specific distributed crypto-ledger of a first entity, and a second user, associated with a second entity-specific distributed crypto-ledger of a second entity;
wherein the first instruction comprises:
a first encrypted storage identifier that identifies a first encrypted storage associated with the first user and
a second encrypted storage identifier that identifies a second encrypted storage associated with the second user;
wherein the first entity is different from the second entity;
wherein the first entity and the second entity are members of the membered common distributed crypto-ledger;
wherein the first entity-specific distributed crypto-ledger of the first entity is operatively linked to the membered common distributed crypto-ledger via a first common encrypted storage, stored on a first common node of the membered common distributed crypto-ledger;
wherein the second entity-specific distributed crypto-ledger of the second entity is operatively linked to the membered common distributed crypto-ledger via a second common encrypted storage, stored on a second common node of the membered common distributed crypto-ledger;
wherein the first common encrypted storage is a first entity encrypted storage for all users of the first entity-specific distributed crypto-ledger;
wherein the second common encrypted storage is a second entity encrypted storage for all users of the second entity-specific distributed crypto-ledger;

determining, by the controller, a first quantity of first entity-specific crypto-tokens on the first entity-specific distributed crypto-ledger based at least in part on the at least one operation;

determining, by the controller, a second quantity of common crypto-tokens that is equivalent to the first quantity of the first crypto-tokens;

instructing, by the controller, the first common node to burn the first quantity of first entity-specific crypto-tokens from the first entity-specific distributed crypto-ledger;

instructing, by the controller, the membered common distributed crypto-ledger to mint the second quantity of the common crypto-tokens in the first common distributed crypto-ledger encrypted storage on the membered common distributed crypto-ledger;

instructing, by the controller, the membered common distributed crypto-ledger to move the second quantity of common crypto-tokens from the first common distributed crypto-ledger encrypted storage to a second common distributed crypto-ledger encrypted storage;

determining, by the controller, a third quantity of second entity-specific crypto-tokens that is equivalent to the second quantity of the common crypto-tokens;

instructing, by the controller, the second common node of the common distributed crypto-ledger to burn the second quantity of the common crypto-tokens from the second common distributed crypto-ledger encrypted storage;

instructing, by the controller, the second entity-specific distributed crypto-ledger to mint the third quantity of the second entity-specific crypto-tokens on the second entity-specific distributed crypto-ledger so as to convert the common crypto-tokens to the second entity-specific crypto-tokens; and returning, by the controller, a confirmation that confirms the at least one operation based at least in part on the third quantity of the at least one second crypto-token being minted in the second encrypted storage.

2. The method as recited in claim 1, further comprising:
accessing, by the controller, a user-entity registry comprising a mapping of encrypted storage identifiers enrolled with the membered common distributed crypto-ledger to entity-specific distributed crypto-ledgers enrolled with the membered common distributed crypto-ledger; and determining, by the controller, the second common distributed crypto-ledger encrypted storage based at least in part on the second encrypted storage identifier and the user-entity registry.

3. The method as recited in claim 1, further comprising:
utilizing, by the controller, a first interoperability smart contract to instruct the first common node to burn the first quantity of first crypto-tokens from the first encrypted storage; and utilizing, by the controller, a second interoperability smart contract to instruct the second common node to mint the third quantity of second entity-specific crypto-tokens from the first encrypted storage.

4. The method as recited in claim 3, wherein the first interoperability smart contract to further instructs the first common node to produce at least one operation record representing the at least one operation; and wherein the at least one operation record comprises the second encrypted storage identifier.

5. The method as recited in claim 4, further comprising:
receiving, by the controller, the at least one operation record from the first common node;

utilizing, by the controller, a common interoperability smart contract to mint the second quantity of the common crypto-tokens in the first common distributed crypto-ledger encrypted storage on the membered common distributed crypto-ledger; and utilizing, by the controller, a common interoperability smart contract to instruct the membered common distributed crypto-ledger to move the second quantity of common crypto-tokens from the first common distributed crypto-ledger encrypted storage to the second common distributed crypto-ledger encrypted storage based at least in part on the at least one operation record.

6. The method as recited in claim 5, wherein the common interoperability smart contract causes the membered common distributed crypto-ledger to create a membered common distributed crypto-ledger entry comprising the second quantity of common crypto-tokens and the at least one operation record.

7. The method as recited in claim 1, wherein the first entity-specific crypto-tokens comprise a first stablecoin;
wherein the second entity-specific crypto-tokens comprise a second stablecoin; and
wherein the common crypto-tokens comprise a third stablecoin.

8. The method as recited in claim 1, wherein the first instruction causes the first entity-specific crypto-ledger to move the first quantity of the first entity-specific crypto-tokens from the first encrypted storage to a first common node encrypted storage of the first common node.

9. The method as recited in claim 1, further comprising instructing, by the controller, the second entity-specific distributed crypto-ledger to move the third quantity of the second entity-specific crypto-tokens from a second common node encrypted storage of the second common node to the second encrypted storage.

10. The method as recited in claim 1, further comprising:
receiving, by the controller, a first notification indicative of the asset quantity being stored in a first common omnibus associated with the first entity;

instructing, by the controller, the membered common distributed crypto-ledger to mint the second quantity of the common crypto-tokens in the first common distributed crypto-ledger encrypted storage on the membered common distributed crypto-ledger based on the notification so as to create in the first common distributed crypto-ledger encrypted storage the second quantity of the common crypto-tokens based on the asset quantity;

receiving, by the controller, a second notification indicative of the asset quantity being received by a second common omnibus associated with the second entity; and instructing, by the controller, the second common node of the common distributed crypto-ledger to burn the second quantity of the common crypto-tokens from the second common distributed crypto-ledger encrypted storage in response to the second notification.

11. A system comprising:
a controller configured to perform steps to:
receive, from a membered common distributed crypto-ledger, a first instruction to perform at least one operation between a first user, associated with a first entity-specific distributed crypto-ledger of a first entity, and a second user, associated with a second entity-specific distributed crypto-ledger of a second entity;

wherein the first instruction comprises:
a first encrypted storage identifier that identifies a first encrypted storage associated with the first user and
a second encrypted storage identifier that identifies a second encrypted storage associated with the second user;
wherein the first entity is different from the second entity;
wherein the first entity and the second entity are members of the membered common distributed crypto-ledger;
wherein the first entity-specific distributed crypto-ledger of the first entity is operatively linked to the membered common distributed crypto-ledger via a first common encrypted storage, stored on a first common node of the membered common distributed crypto-ledger;
wherein the second entity-specific distributed crypto-ledger of the second entity is operatively linked to the membered common distributed crypto-ledger via a second common encrypted storage, stored on a second common node of the membered common distributed crypto-ledger;
wherein the first common encrypted storage is a first entity encrypted storage for all users of the first entity-specific distributed crypto-ledger;
wherein the second common encrypted storage is a second entity encrypted storage for all users of the second entity-specific distributed crypto-ledger;
determine a first quantity of first entity-specific crypto-tokens on the first entity-specific distributed crypto-ledger based at least in part on the at least one operation;
determine a second quantity of common crypto-tokens that is equivalent to the first quantity of the first crypto-tokens;
instruct the first common node to burn the first quantity of first entity-specific crypto-tokens from the first entity-specific distributed crypto-ledger;
instruct the membered common distributed crypto-ledger to mint the second quantity of the common crypto-tokens in the first common distributed crypto-ledger encrypted storage on the membered common distributed crypto-ledger;
instruct the membered common distributed crypto-ledger to move the second quantity of common crypto-tokens from the first common distributed crypto-ledger encrypted storage to a second common distributed crypto-ledger encrypted storage;
determine a third quantity of second entity-specific crypto-tokens that is equivalent to the second quantity of the common crypto-tokens;
instruct the second common node of the common distributed crypto-ledger to burn the second quantity of the common crypto-tokens from the second common distributed crypto-ledger encrypted storage;
instruct the second entity-specific distributed crypto-ledger to mint the third quantity of the second entity-specific crypto-tokens on the second entity-specific distributed crypto-ledger so as to convert the common crypto-tokens to the second entity-specific crypto-tokens; and
return confirmation that confirms the at least one operation based at least in part on the third quantity of the at least one second crypto-token being minted in the second encrypted storage.

12. The system as recited in claim 11, wherein the controller is further configured to perform steps to:
access a user-entity registry comprising a mapping of encrypted storage identifiers enrolled with the membered common distributed crypto-ledger to entity-specific distributed crypto-ledgers enrolled with the membered common distributed crypto-ledger; and
determine the second common distributed crypto-ledger encrypted storage based at least in part on the second encrypted storage identifier and the user-entity registry.

13. The system as recited in claim 11, wherein the controller is further configured to perform steps to:
utilize a first interoperability smart contract to instruct the first common node to burn the first quantity of first crypto-tokens from the first encrypted storage; and
utilize a second interoperability smart contract to instruct the second common node to mint the third quantity of second entity-specific crypto-tokens from the first encrypted storage.

14. The system as recited in claim 13, wherein the first interoperability smart contract to further instructs the first common node to produce at least one operation record representing the at least one operation; and
wherein the at least one operation record comprises the second encrypted storage identifier.

15. The system as recited in claim 14, wherein the controller is further configured to perform steps to:
receive the at least one operation record from the first common node;
utilize a common interoperability smart contract to mint the second quantity of the common crypto-tokens in the first common distributed crypto-ledger encrypted storage on the membered common distributed crypto-ledger; and
utilize a common interoperability smart contract to instruct the membered common distributed crypto-ledger to move the second quantity of common crypto-tokens from the first common distributed crypto-ledger encrypted storage to the second common distributed crypto-ledger encrypted storage based at least in part on the at least one operation record.

16. The system as recited in claim 15, wherein the common interoperability smart contract causes the membered common distributed crypto-ledger to create a membered common distributed crypto-ledger entry comprising the second quantity of common crypto-tokens and the at least one operation record.

17. The system as recited in claim 11, wherein the first entity-specific crypto-tokens comprise a first stablecoin;
wherein the second entity-specific crypto-tokens comprise a second stablecoin; and
wherein the common crypto-tokens comprise a third stablecoin.

18. The system as recited in claim 11, wherein the first instruction causes the first entity-specific crypto-ledger to move the first quantity of the first entity-specific crypto-tokens from the first encrypted storage to a first common node encrypted storage of the first common node.

19. The system as recited in claim 11, wherein the controller is further configured to perform steps to instruct the second entity-specific distributed crypto-ledger to move the third quantity of the second entity-specific crypto-tokens from a second common node encrypted storage of the second common node to the second encrypted storage.

20. The system as recited in claim 11, wherein the controller is further configured to perform steps to:

receive a first notification indicative of the asset quantity being stored in a first common omnibus associated with the first entity;

instruct the membered common distributed crypto-ledger to mint the second quantity of the common crypto-tokens in the first common distributed crypto-ledger encrypted storage on the membered common distributed crypto-ledger based on the notification so as to create in the first common distributed crypto-ledger encrypted storage the second quantity of the common crypto-tokens based on the asset quantity;

receive a second notification indicative of the asset quantity being received by a second common omnibus associated with the second entity; and instruct the second common node of the common distributed crypto-ledger to burn the second quantity of the common crypto-tokens from the second common distributed crypto-ledger encrypted storage in response to the second notification.

* * * * *